(12) United States Patent
Couch et al.

(10) Patent No.: US 6,243,703 B1
(45) Date of Patent: *Jun. 5, 2001

(54) METHOD OF ACCESSING AND DISPLAYING SUBSYSTEM PARAMETERS INCLUDING GRAPHICAL PLAN TABLE DATA

(75) Inventors: Tanya Couch, San Jose; Catherine E. Drummond, Morgan Hill, both of CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,636

(22) Filed: Oct. 14, 1997

(51) Int. Cl.[7] ........................ G06F 17/30
(52) U.S. Cl. ................ 707/10; 709/217; 345/357
(58) Field of Search ................ 707/102, 103, 707/217, 2, 4, 100, 1, 9, 10, 12; 709/217, 300; 345/335, 346, 968, 965, 336, 357, 146, 353

(56) References Cited

U.S. PATENT DOCUMENTS

| | | | |
|---|---|---|---|
| 5,265,246 | 11/1993 | Li et al. | 707/4 |
| 5,379,419 | 1/1995 | Heffernan et al. | 707/4 |
| 5,421,008 * | 5/1995 | Banning et al. | 707/4 |
| 5,428,737 | 6/1995 | Li et al. | 707/4 |
| 5,428,776 | 6/1995 | Rothfield | 707/4 |
| 5,432,932 * | 7/1995 | Chen et al. | 345/965 |
| 5,471,575 * | 11/1995 | Giansante | 395/144 |
| 5,471,613 | 11/1995 | Banning et al. | 707/4 |
| 5,546,570 * | 8/1996 | McPherson, Jr. et al. | 707/4 |
| 5,548,758 * | 8/1996 | Pirahesh et al. | 707/2 |
| 5,555,403 | 9/1996 | Cambot et al. | 707/4 |
| 5,574,918 * | 11/1996 | Hurley et al. | 712/220 |
| 5,584,024 | 12/1996 | Shwartz | 707/4 |

(List continued on next page.)

FOREIGN PATENT DOCUMENTS 7-182358  7/1995  (JP).

OTHER PUBLICATIONS

IBM, Internet article, HTTP://WWW.SPI.ORG/cgi–bin/newqry?ISA=Hit ... 1997&rec=15&submit=seeit&csum=18342319056, "File System which Integrates and Collates Text and Tablet Entered Script and Graphics for Text Creation and Commentary", Software Patent Institute Database of Software Technologies, Record Display, Record 15, Jul. 1973 (entire document).

IBM Technical Disclosure Bulletin, "Access Path Selection in a Relational Database Management System", vol. 22, No. 4, Sep. 1979, pp. 1657–1660.

(List continued on next page.)

*Primary Examiner*—Jack Choules
*Assistant Examiner*—Greta L. Robinson
(74) *Attorney, Agent, or Firm*—Ingrid M. Foerster

(57) ABSTRACT

A method, apparatus, and article of manufacture for a computer implemented database interpreter. A main window is displayed that provides selection of subsystem parameter browsing. When subsystem parameter browsing is selected, subsystem parameters are extracted from the database. Next, access to the extracted subsystem parameters is provided within a subsystem parameters window. Additionally, the computer can be a workstation that is connected to a mainframe storing the database. The main window is displayed providing selection of graphical plan representation at the workstation. When graphical plan representation is selected, at the workstation, plan table data is extracted from the database at the mainframe. Next, a graphical representation of the plan table data is displayed at the workstation.

33 Claims, 25 Drawing Sheets

U.S. PATENT DOCUMENTS

| | | | |
|---|---|---|---|
| 5,586,311 | | 12/1996 | Davies et al. ............................ 707/1 |
| 5,596,745 | | 1/1997 | Lai et al. ............................ 707/103 |
| 5,600,831 | | 2/1997 | Levy et al. ............................ 707/2 |
| 5,630,125 | * | 5/1997 | Zellweger ............................ 707/103 |
| 5,659,728 | * | 8/1997 | Bhargava et al. ........................ 707/2 |
| 5,689,668 | * | 11/1997 | Beaudet et al. ...................... 345/353 |
| 5,768,578 | * | 6/1998 | Kirk et al. ............................ 707/100 |
| 5,778,354 | * | 7/1998 | Leslie et al. ............................ 707/2 |
| 5,806,059 | * | 9/1998 | Tsuchida et al. ........................ 707/2 |
| 5,822,750 | * | 10/1998 | Jou et al. ............................... 707/2 |
| 5,832,477 | * | 11/1998 | Bhargava et al. ........................ 707/2 |
| 5,877,757 | * | 3/1999 | Baldwin et al. ...................... 345/336 |
| 5,995,921 | * | 11/1999 | Richards et al. ........................ 704/9 |
| 6,064,821 | * | 5/2000 | Shough et al. ........................ 395/712 |

OTHER PUBLICATIONS

IBM, Internet article, HTTP://WWW.SPI.ORG/cgi–bin/newqry?ISA=Hit . . . 1997&rec=14&submit=seeit&csum=19827063693, "Schema and subschema and Languages Date manipulation languages (DML) and Query languages and Decompiling Codasyl DML into relational queries. [From Nonbook Literature; G. Mathematics of Computing; H.2 Database Management; H.2.1 Logical Design]", Software Patent Institute Database of Software Technologies, Record Display, Record 14, Feb. 1, 1982 (entire document).

IBM Technical Disclosure Bulletin, "Dynamically Linking and Managing Windows", vol. 38, No. 2, Feb. 1995, pp. 457–461.

Xtrieve Interactive Query Manual by Novell, pp. 1.3, 1.4, and 11.17 through 11.20, Oct. 1988.*

* cited by examiner

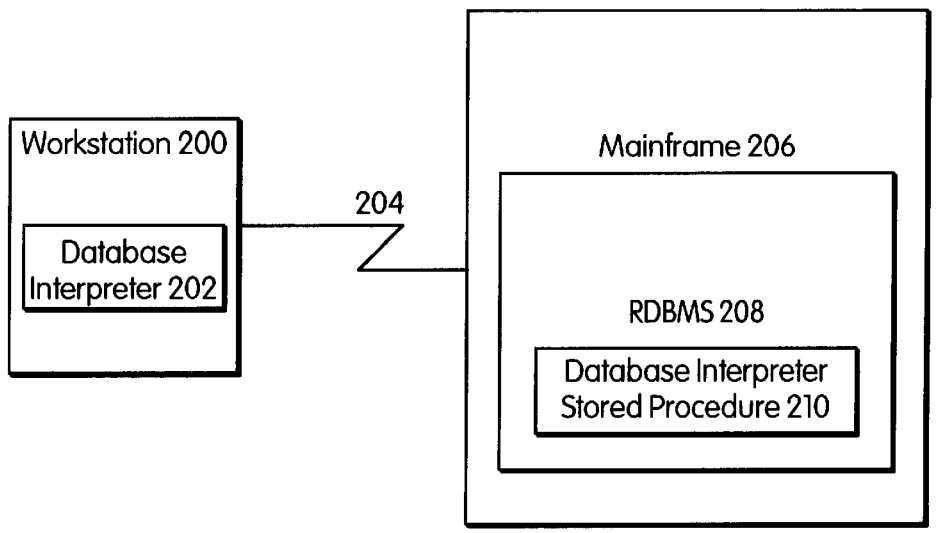

FIG. 2

Explain all for

302 {
SELECT T1.NAME, T1.DEPT
FROM T1, T2, T3
  WHERE T1.SALARY = T2.SALARY
  AND T2.DEPT = T3.DEPT
  AND T1.SALARY =
  (SELECT INCOME FROM T4
  WHERE LOCATION = STL)

| | | | | 300 |
|---|---|---|---|---|
| QUERYNO | 214 | 214 | 214 | 214 |
| QBLOCKNO | 1 | 1 | 1 | 2 |
| APPLNAME | PLAN1 | PLAN1 | PLAN1 | PLAN1 |
| PROGNAME | DSNEMPL1 | DSNEMPL1 | DSNEMPL1 | DSNEMPL1 |
| PLANNO | 1 | 2 | 3 | 1 |
| METHOD | 0 | 1 | 1 | 1 |
| TNAME | T1 | T2 | T3 | T4 |
| TABNO | 1 | 2 | 3 | 1 |
| ACCESSTYPE | I | I | I | R |
| MATCHCOLS | 1 | 1 | 1 | |
| ACCESSNAME | IDX1 | IDX2 | IDX3 | |
| INDEXONLY | N | Y | Y | |
| SORTN_UNIQ | N | N | N | N |
| SORTN_JOIN | N | N | N | N |
| SORTN_ORDERBY | N | N | N | N |
| SORTN_GROUPBY | N | N | N | N |
| SORTC_UNIQ | N | N | N | N |
| SORTC_JOIN | N | N | N | N |
| SORTC_ORDERBY | N | N | N | N |
| SORTC_GROUPBY | N | N | N | N |
| PREFETCH | L | | | S |
| MIXOPSEQ | 0 | 0 | 0 | 0 |
| etc | | | | |

FIG. 3

METHOD OF ACCESSING AND DISPLAYING SUBSYSTEM PARAMETERS INCLUDING GRAPHICAL PLAN TABLE DATA

BACKGROUND OF THE INVENTION

1. Field of the Invention

This invention relates in general to a computer-implemented database system, and more particularly, to explaining data using a graphical user interface.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of doing the query.

The RDBMS software uses various data, including statistics in a RDBMS catalog, during bind time to determine the access paths of SQL statements. A utility, called RUNSTATS, updates the RDBMS catalog with statistics on table spaces, indexes, tables, and columns. Additionally, when an SQL statement is processed during a bind phase, an access path is determined for the statement. The access path is a compiled run-time structure used for executing the SQL statement. The access path is the path the RDBMS uses to get to the data that SQL statements request. For example, an SQL statement might search an entire table space, or it might use an index. The access path is the key to determining how well an SQL statement performs. The data associated with the access path is stored in the DB2 directory, or optionally in a plan table. The plan table holds information about a plan, which is a set of one or more programs or is a portion of a program.

Analyzing and improving performance of SQL statements is currently too time-consuming and complex for the average user. In a conventional system, a user typically improves performance of SQL statements by determining the access path for a SQL statement by manually interpreting data in the plan table that holds data associated with the access path. Moreover, in conventional systems, although data in a plan table is available on a mainframe, it is in a format that is difficult to understand and must be interpreted by the user. Therefore, conventional systems do not offer users at workstations access to databases on a mainframe for obtaining data in the plan table that is easy to understand. There is a need in the art for providing users at workstations access to this information from the mainframe and providing an improved technique for users to optimize access paths.

Additionally, the RDBMS has subsystem parameters that describe the values of user set options, such as the number of current users and number of open datasets allowed at one time. Conventional systems do not provide an easy way to display and find the values, install field names, and descriptions of the subsystem parameters. There is a need in the art for an improved technique that allows a user to view subsystem parameters.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented database interpreter.

In accordance with the present invention, a query is executed in a computer, the query being performed by the computer to retrieve data from a database stored on a data storage device connected to the computer. A main window is displayed that provides selection of subsystem parameter browsing. When subsystem parameter browsing is selected, subsystem parameters are extracted from the database. Next, access to the extracted subsystem parameters is provided within a subsystem parameters window.

In accordance with another aspect of the present invention, the computer is a workstation that is connected to a mainframe storing the database. The main window is displayed providing selection of graphical plan representation at the workstation. When graphical plan representation is selected, at the workstation, plan table data is extracted from the database at the mainframe. Next, a graphical representation of the plan table data is displayed at the workstation.

An object of the invention is to provide an improved method of extracting plan table data from a database. Another object of the invention is to provide easy access to subsystem parameters. Yet another object of the invention is to provide a graphical representation of plan table data on a workstation connected to a mainframe having a database that stores the plan table data.

BRIEF DESCRIPTION OF THE DRAWINGS

Referring now to the drawings in which like reference numbers represent corresponding parts throughout:

FIG. 2 is an exemplary hardware architecture used to implement the preferred embodiment of the invention;

FIG. 3 illustrates a sample SQL statement and sample PLAN_TABLE data available in conventional systems;

DETAILED DESCRIPTION OF THE PREFERRED EMBODIMENT

Figure 1:
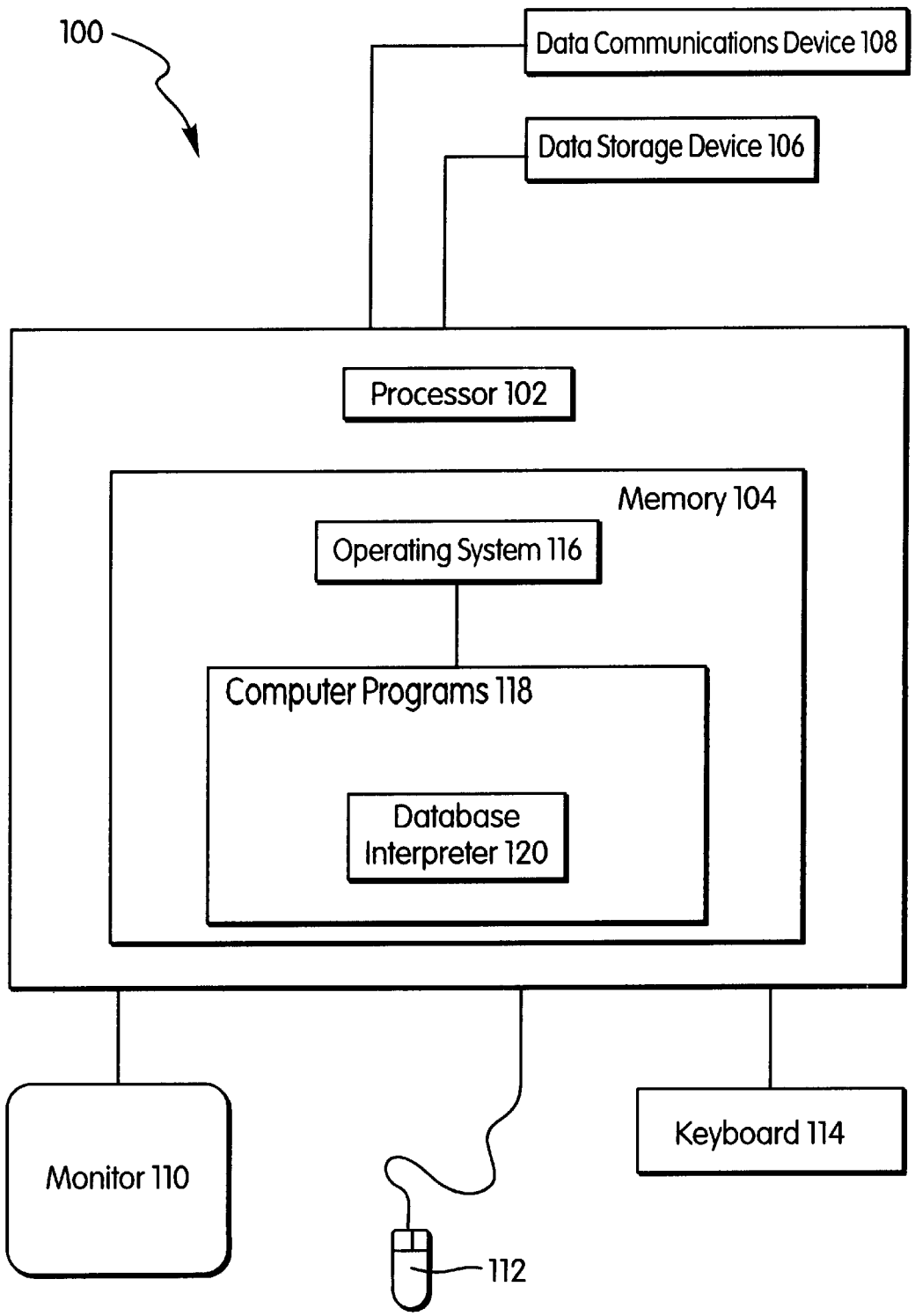
FIG. 1 is an exemplary hardware environment used to implement the preferred embodiment of the invention.

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.
Hardware Environment FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112, and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as MVS®, AIX®, OS/2®, WINDOWS NT®, WINDOWS®, UNIX®, etc. The operating system 116 is booted into the memory 102 of the computer 100 for execution when the computer 100 is powered-on or reset. In turn, the operating system 116 then controls the execution of one or more computer programs 118 by the computer 100. The present invention is generally implemented in these computer programs 118, which execute under the control of the operating system 116 and cause the computer 100 to perform the desired functions as described herein. Alternatively, the present invention may be implemented in the operating system 116 itself. In particular, the present invention is typically implemented as a computer program referred to as a database interpreter 120.

The operating system 116 and computer programs 118 are comprised of instructions which, when read and executed by the computer 100, causes the computer 100 to perform the steps necessary to implement and/or use the present invention. Generally, the operating system 116 and/or computer programs 118 are tangibly embodied in and/or readable from a device, carrier, or media, such as memory 102, data storage devices 106, and/or data communications devices 108. Under control of the operating system 116, the computer programs 118 may be loaded from the memory 102, data storage devices 106, and/or data communications devices 108 into the memory 102 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

FIG. 2 is an exemplary hardware architecture used to implement the preferred embodiment of the invention. A workstation computer 200 is connected by a network 204 to a mainframe computer 206, via distributed remote data architecture ("DRDA"). The workstation computer 200 includes a database interpreter 202. The mainframe computer includes relational database management system (RDBMS) software 208, such as the DB2® for OS/390® product sold by IBM Corporation. The present invention also includes a module, called DSNWZP, which is written in assembly language, that runs on the mainframe 206 as a database interpreter stored procedure 210. The RDBMS software 208 receives commands from the database interpreter 202 for performing various search and retrieval functions, termed queries, against one or more databases stored in the data storage devices 106. In the preferred embodiment, these queries conform to the Structured Query Language (SQL) standard, although other types of queries could also be used without departing from the scope of the invention. The queries invoke functions performed by the RDBMS software 208, such as definition, access control, interpretation, compilation, database retrieval, and update of user and system data. Additionally, the database interpreter 202 invokes the stored procedure 210 to extract data from the mainframe 206.

Overview

The present invention provides a database interpreter 120 that allows a user at a workstation 200 to extract data in a database on a connected mainframe computer 206. The database interpreter 120 also provides a graphical user interface that allows a user to easily access the extracted data.

In particular, the database interpreter 120 provides a user with the ability to more easily improve the performance of SQL statements. In particular, the database interpreter 120 provides a user-friendly graphical representation of the access path of an SQL statement, while at the same time providing all of the related catalog information a user needs to quickly and more easily analyze and optimize SQL statements. In addition, the database interpreter 120 provides suggestions for improving the performance of individual operations within an access path.

The database interpreter 120 interprets data from a user's plan table and generates a graphical representation of the access path of any SQL statement in the table. The database interpreter 120 also displays all of the catalog information which is related to the statement, including table, table space, index, column, and column distribution statistics. Using the database interpreter 120, a user can list all plans or packages belonging to a particular user. The database interpreter 120 also provides a list of all explainable statements within a plan or a package to allow a user to select statements to be graphically represented. Explainable statements are SELECT and INSERT statements, not including SELECT INTO statements, and the searched form of UPDATE and DELETE statements.

The database interpreter 120 allows a user to filter the list of explainable statements according to access paths that exist in the statement and thus select only those statements which are of interest. The database interpreter 120 provides the ability to graphically represent a statement through dynamic EXPLAIN from the workstation. The database interpreter 120 allows users to view the values in the plan table on the workstation. Users can filter values or columns to customize their output, and they can also graphically represent statements directly from the plan table.

The database interpreter 120 provides direct access to catalog statistics from the graphical representation of an SQL statement. Where the default statistics are applicable, the database interpreter 120 provides the actual default values that the RDBMS software 208 uses, rather than the default indicator that users would normally see from a catalog query.

The database interpreter 120 provides a subsystem parameter browser which displays values and descriptions for all externalized subsystem parameters, also known as DSNZPARMs or ZPARMs. The database interpreter 120 also provides a user with the ability to view subsystem parameters more easily. The database interpreter 120 allows a user to easily obtain information on particular subsystem parameters. The database interpreter 120 also displays each subsystem parameter value with a description about the parameter.

Database Interpreter Options The database interpreter 120 function helps a user optimize SQL statements. The database interpreter 120 provides a graphical description of the access path of an SQL statement, and displays catalog statistics, suggestions, and other information that can help improve an access path.

FIG. 3 illustrates a sample SQL statement 302 and sample PLAN_TABLE data 300 available in conventional systems. In a conventional system, the user can get information on the access path of an SQL statement. In particular, the RDBMS software 208 inserts rows into a table called the PLAN_TABLE 300. A user can select rows from the PLAN_TABLE to get access path information. However, the user must interpret the PLAN_TABLE data to understand the access path of an SQL statement, which may be difficult because the PLAN_TABLE data is not always intuitive.

The database interpreter 120 interprets the PLAN_TABLE so that a user can more easily understand and use the information in the PLAN_TABLE. The database interpreter 120 interprets the information from the PLAN_TABLE for a user, and translates it into a graphical representation. To build the graphical representations, the database interpreter 120 uses data from any existing RDBMS PLAN_TABLE. The database interpreter 120 also shows the statistics from the catalog on individual objects (tables, indexes, etc.) which the SQL statement references, and provides suggestions for how to improve the statements. The database interpreter 120 also shows the columns that make up a table or an index object and other relevant index column information, such as the order of the columns in an index. Users can also view the statistics of any of the columns of a table or index object. The database interpreter 120 also shows PLAN_TABLE information in an easy to understand manner relevant to a specific step of the graphical representation. If a user wants to view the values in the PLAN_TABLE, the database interpreter 120 displays those values for the user. Additionally, unlike conventional systems, the database interpreter 120 allows a user to invoke the EXPLAIN function for any explainable SQL statement from the workstation to obtain graphical representations and suggestions.

Figure 4:
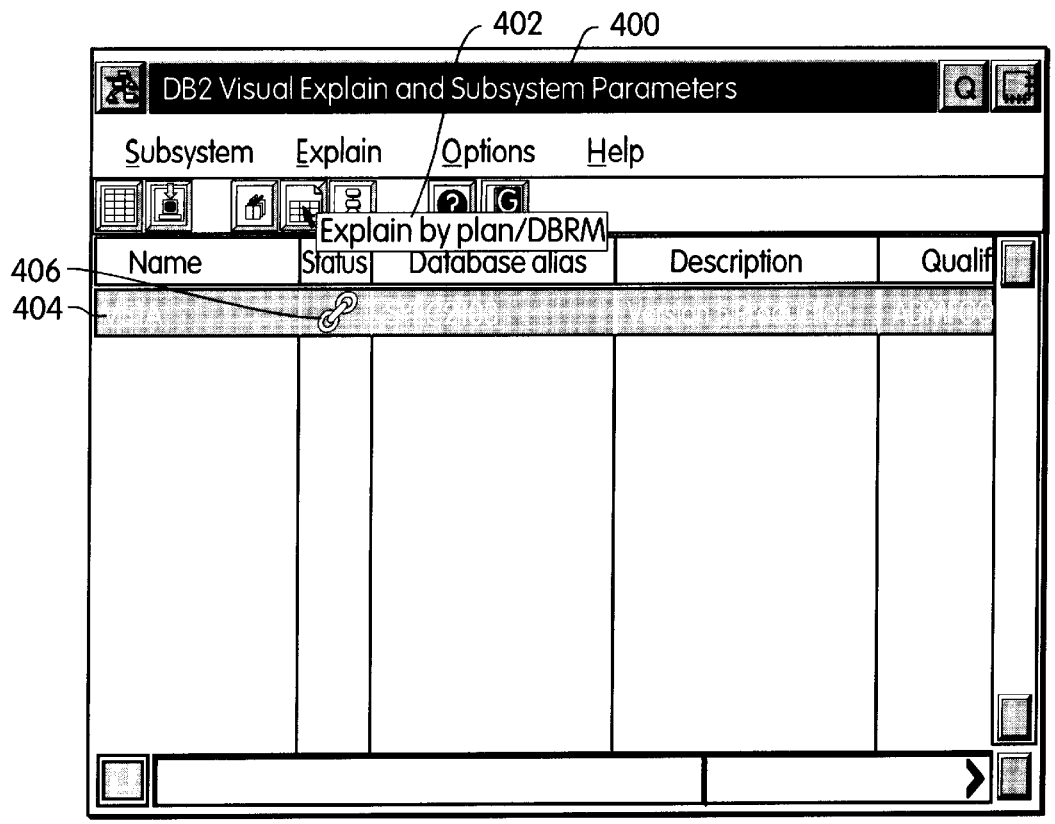
FIG. 4 illustrates a main panel displayed by the database interpreter.

FIG. 4 illustrates a main panel displayed by the database interpreter 120. The main panel 400 provides a main window in which a user can add or remove subsystem (i.e., database) entries, connect or disconnect to and from a subsystem on the mainframe 208, or check a subsystem connection status. The main panel 400 displays icons and menus for various options, including, for example, an Explain by Plan icon 402, along with a list of subsystems, including, for example, subsystem 404. Prior to accessing the RDBMS software 208, a user must connect to the mainframe 208. A user can connect explicitly to the mainframe from the main panel 400 or implicitly by selecting one of the subsystem options from the main panel. The connection status is indicated by the status icon 406. Once one or more subsystems are added to the main window list, a user can select a particular subsystem and perform the following functions from the main panel 400:

Display PLAN_TABLE

Explain by Package

Explain by Plan

Dynamic EXPLAIN

Subsystem Parameter Browser

The Display PLAN_TABLE option provides a view that allows a user to view the values of any RDBMS PLAN_TABLE on the mainframe 206, as long as the user has the proper security authorization. The PLAN_TABLE may be filtered before or after it is loaded according to query number, application name, program name, timestamp, version or collection identifier. A user may also select particular columns of the PLAN_TABLE for display. From the Display PLAN_TABLE panel, a user can also request that the database interpreter 120 graphically represent a statement or view the SQL text of the statement.

The Explain by Package option provides a view that allows the user to enter the name of the particular package to view, or alternatively to list all packages belonging to a user. Once the list of packages is displayed, the user can then select any package. When the package is selected, the user then sees a list of all explainable SQL statements in the package. The user can then select SQL statements that the database interpreter 120 will graphically represent.

The Explain by Plan option provides a view that is similar to the Explain by Package option, except that the Explain by Plan option allows users to see all of the plans and database request modules ("DBRMs") owned by a particular user. Once a plan is selected, the user may select an Explainable Statements option to display all of the Explainable SQL statements within the plan and DBRM.

The Dynamic EXPLAIN option provides a view that allows the user to enter the text of an SQL statement and to send that statement to the RDBMS software 208 on the mainframe 206, where the RDBMS software 208 will dynamically explain the statement. The RDBMS software 208 will update the user's PLAN_TABLE, and with that data, the database interpreter 120 provides a graphical representation of the SQL statement. If the Dynamic EXPLAIN view is invoked from the Explainable Statements view, the Graph view, or the SQL text view, the text of the selected SQL statement is provided on the Dynamic EXPLAIN view, and the user can modify that statement as desired. The Dynamic EXPLAIN view allows use of the cut, copy and paste features and allows a user to read a statement from a file in order to quickly create the SQL statement which is to be explained.

The Explainable Statements view provides a list of all explainable statements within a plan or a package in order to allow the user to select a particular statement for the database interpreter to graphically represent. This view includes a filter feature that allows the user to filter out statements according to access path criteria. For example, the Explainable Statements view can be filtered to display only those statements within the package that include sort operations. From the Explainable Statements view, the user can request the database interpreter 120 to graphically represent the selected statement, to view the SQL text for the statement, or to show the SQL statement's access path representation in the PLAN_TABLE.

A Graph option is available from the PLAN_TABLE view and explainable statements view. The Graph option provides a graphical representation that includes a split pane view that displays the graphical representation in one pane and information about the graphical representation in the other pane. Steps of an SQL statement are represented as a node within the graphical representation. Tables, indexes, and operations are graphically represented with unique graphical symbols that indicate the item being represented. For example, rectangles represent tables, triangles represent indexes and octagons represent operations, such as table space scans, index scans, joins, etc. The graphical representation shows the relationship between these database objects and the operations. When the user selects a node of the graphical representation, information related to that node is displayed in the information pane.

Within a graph view, if the user selects a table or an index, the database interpreter 120 formulates the correct catalog queries to get statistics for the table or index. The database interpreter 120 then issues the query via DRDA and provides the statistics to the right of the graphical representation in an easy-to-read format. From these catalog statistics, users can get table space, index, column, and column distribution statistics. In addition, the user can display a list of all of the columns in the index or table, or a list of all of the indexes on a table.

Within a graph view, if the user selects an operation node on the graphical representation, information about the operation displays to the right of the graphical representation, and a "suggestions" button appears. If the user selects the suggestions button, then another view appears with suggestions as to how to improve the access path of the selected operation.

The database interpreter 120 provides subsystem parameter browsing which provides a new approach to viewing the values of the DSNZPARMS. The database interpreter 120 makes a call to a stored procedure 210 running on the RDBMS software 208 on the mainframe 206. The stored procedure 210 makes an Instrumentation Facility Interface ("IFI") call to the RDBMS software 208 (i.e., a call to a component of the database) to get an IFI record, which contains the current values of subsystem parameters that the RDBMS software 208 is using. This stored procedure 210 can be called by the database interpreter 120 and returns the following information:

The DSNZPARM macro and parameter names

The cross-referenced install panel name and install panel field name

The value of the parameter

Once the information is sent from the stored procedure 210 at the mainframe 206 to the workstation 200, the database interpreter 120 provides the added benefit of descriptive text for each parameter. The database interpreter 120 allows the parameters to be grouped by parameter name, install field name, or install panel. The database interpreter 120 also provides a search facility that will find any string, including the name of the parameter or any value in the descriptive text.

Graphical Representation of a PLAN_TABLE

Figure 5:
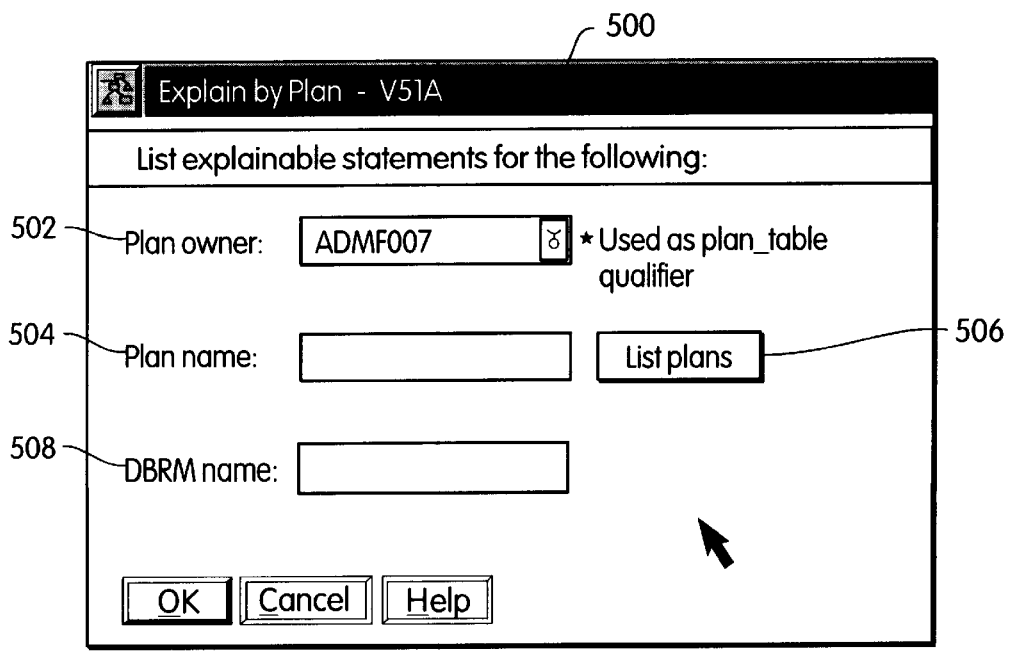
FIG. 5 illustrates an Explain by Plan window displayed by the database interpreter 120 to obtain plan information from a user.

FIG. 5 illustrates an Explain by Plan window 500 displayed by the database interpreter 120 to obtain plan information from a user. When a user selects an Explain by Plan option 402, the database interpreter 120 provides a window 500 that allows a user to enter a plan owner 502 and a plan 504 or a DBRM name for which the user is requesting a list of explainable statements. The plan owner 502 is used as a PLAN_TABLE qualifier. If a user is not sure of the name of a plan or of a DBRM, the user can enter the plan owner data and select the "List plans" button 506, which will produce a list of plans and a DBRM for the identified plan owner from which the user can select a plan.

Figure 6:
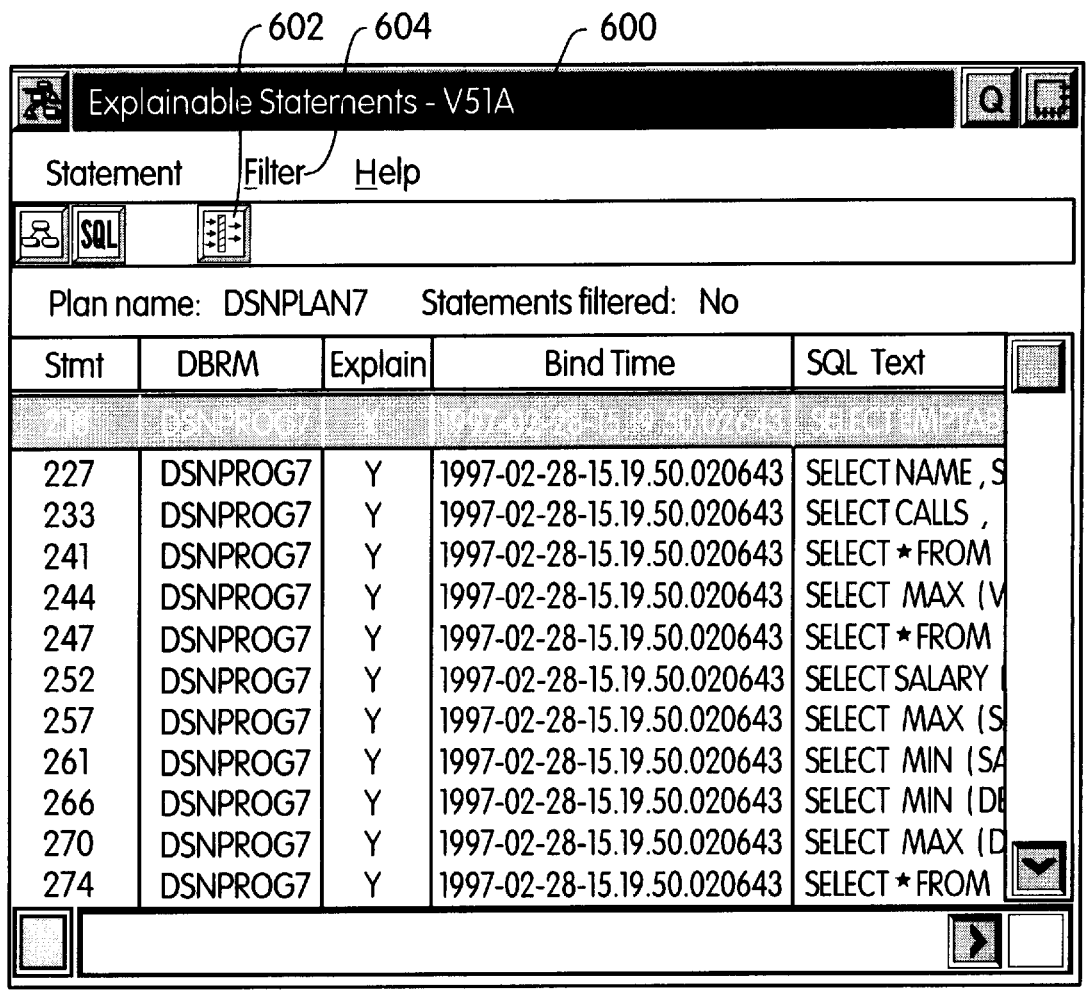
FIG. 6 illustrates an Explainable Statements window displayed by the database interpreter.

FIG. 6 illustrates an Explainable Statements window 600 displayed by the database interpreter 120. The Explainable Statements window 600 lists all of the explainable statements in the plan that was identified with information entered on window 500. Explainable statements are SELECT and INSERT statements, not including SELECT INTO statements, and the searched form of UPDATE and DELETE statements.

Some plans do not have any explainable statements. A user can select any of the statements on the view to display access path information or the SQL text for that statement. The Explainable Statements window 600 includes a filter icon 602 and a filter menu 604. By selecting the filter icon 602 or the filter menu 604, a user can view only those statements that meet certain access path criteria. For example, only those statements which have sorts, table space scans, multiple index scans, and hybrid joins.

Figure 7:
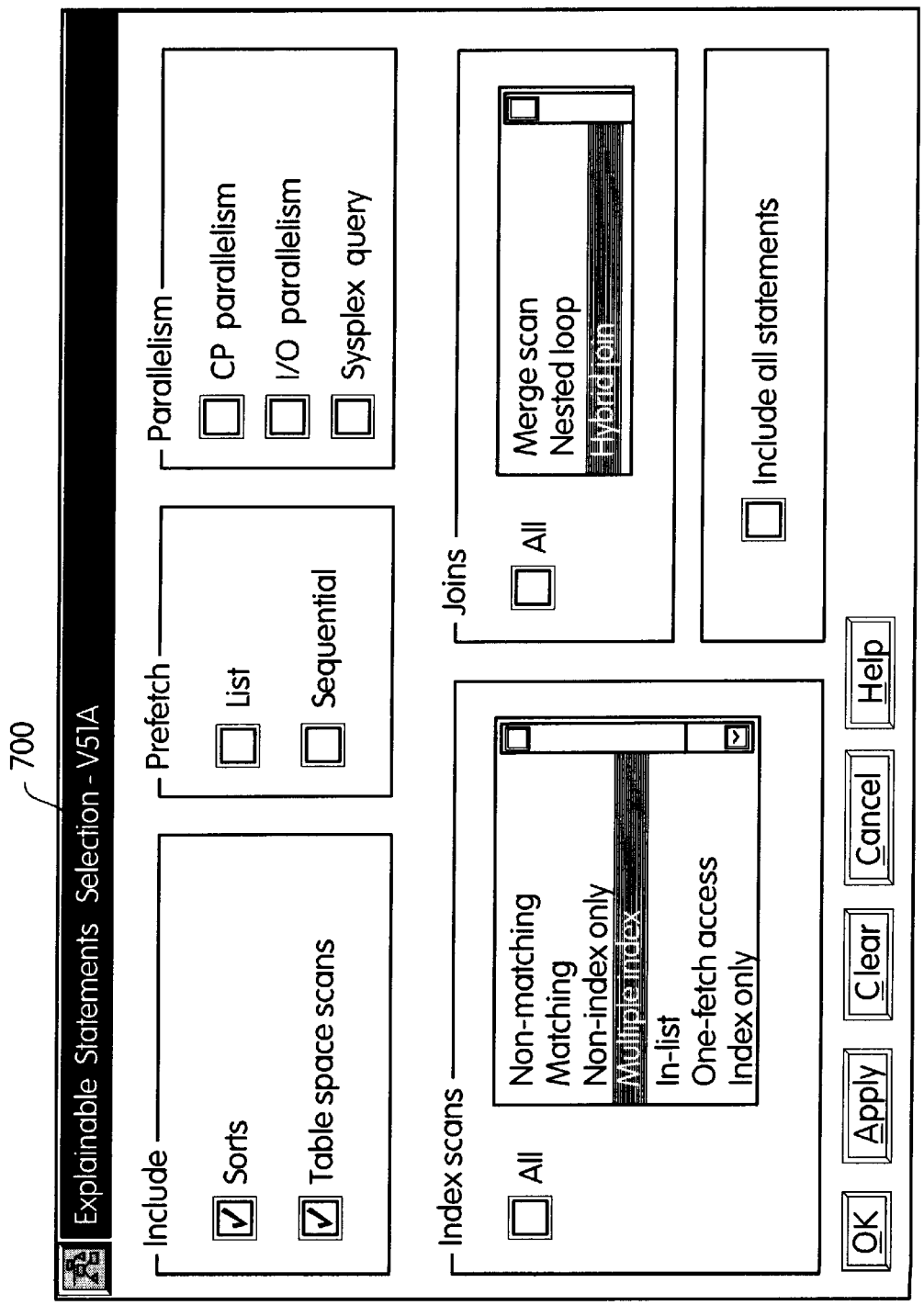
FIG. 7 illustrates a Filter window displayed by the database interpreter.

FIG. 7 illustrates a Filter window 700 displayed by the database interpreter 120. This Filter window 700 is displayed when a user selects the filter icon 602. The Filter window 700 allows the user to specify the access path criteria to narrow down the explainable statement list. The database interpreter 120 then displays a new explainable statements window with a list of only those statements which met the filter criteria.

Figure 8:
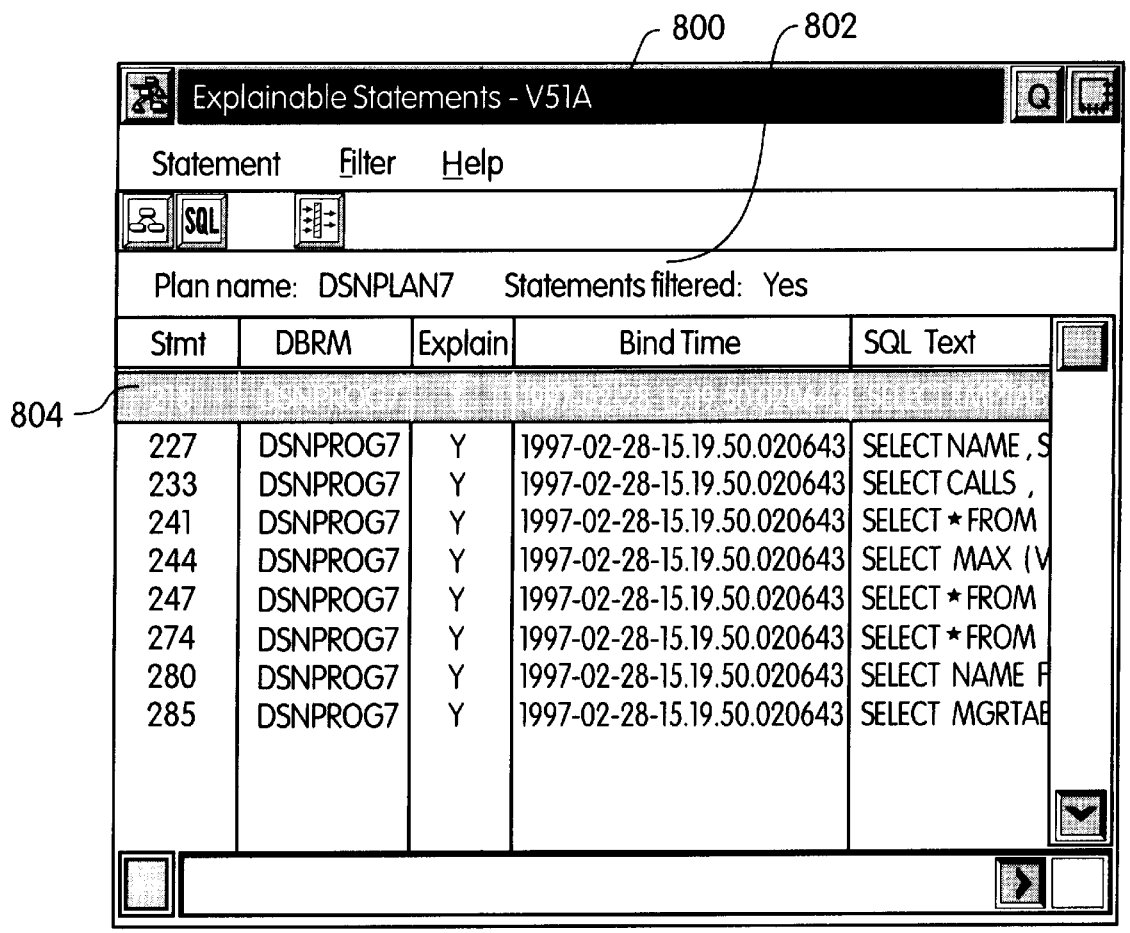
FIG. 8 illustrates a filtered Explainable Statements window displayed by the database interpreter.

FIG. 8 illustrates a filtered Explainable Statements window 800 displayed by the database interpreter 120. The new Explainable Statements window 800 includes a Statements Filtered heading 802 that now says "Yes" to indicate that the listed statements have been filtered. An explainable statement can be selected (e.g., using an input device such as a mouse) to view the graphical representation of the access path for that explainable statement.

Figure 9:
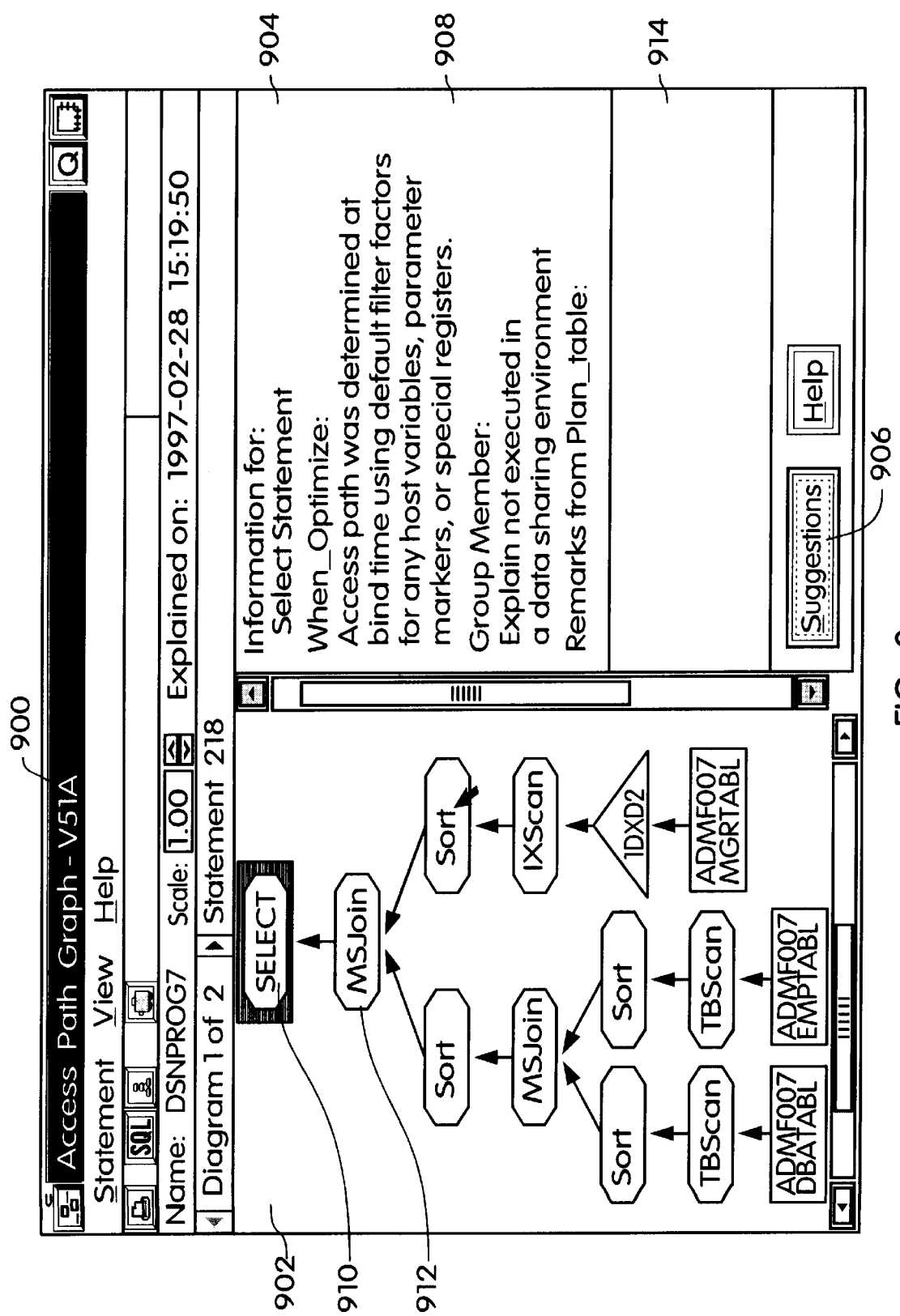
FIG. 9 illustrates an Access Path Graph window displayed by the database interpreter.

FIG. 9 illustrates an Access Path Graph window 900 displayed by the database interpreter 120. The Access Path Graph window 900 was displayed in response to a user selecting explainable statement 804 in the Explainable Statements window 800. The Access Path Graph window 900 is split into two panes 902, 904, with a graph pane 902 displaying the graphical representation of the access path and an information pane 904 containing information 908 about the access path and including a suggestions button 906 that can be selected for obtaining suggestions on modifications that can be made that may improve the access path.

A user can choose to see statistics on columns, indexes, tables, and table spaces associated with objects in the graphical representation. If the user selects an operation (i.e., a node in the graphical representation), information about the operation appears in the information pane 904. The suggestions button provides suggestions on how to improve the access path of the statement.

The graphical representation of the access path in the graph pane 902 represents the access path of the SQL statement. The node 910 at the top shows the type of SQL statement (e.g., SELECT). The next level 912 in this example shows a merge scan join. In the graphical representation of the access path, the database interpreter 120 uses octagons to identify operations (such as table space scan), triangles to represent indexes, and rectangles to represent tables. The graphical representation of the access path provides an option to view an overview of the graphical representation to indicate which part of the graphical representation the user is viewing. If the user selects a table or index, the database interpreter 120 displays catalog statistics for that object in the data area 914 in the information pane 904. In particular, if the user selects an index, the database interpreter 120 displays information including catalog statistics for the index and buttons that allow users to view the columns of the index and catalog statistics on the column. If the user selects a table, the database interpreter 120 displays information including catalog statistics for the table and buttons that allow the user to view the columns of the table, the catalog statistics on the columns, and table space catalog statistics.

Figure 10:
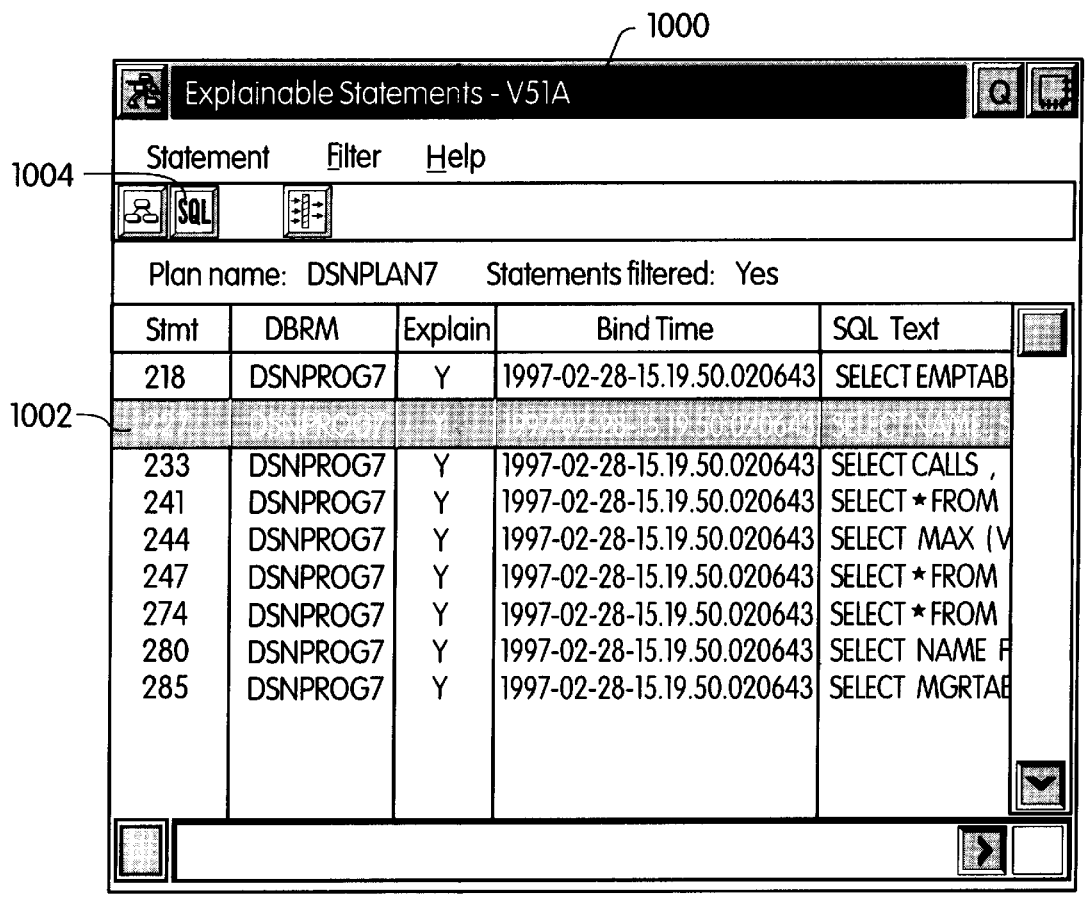
FIG. 10 illustrates an Explainable Statements window displayed by the database interpreter.

FIG. 10 illustrates an Explainable Statements window 1000 displayed by the database interpreter 120. A user can obtain the text of an explainable statement 1002 by selecting an SQL button 1004, and the entire SQL statement will be displayed. Additionally, any explainable statement, such as statement 1002, can be selected for graphing.

Figure 11:
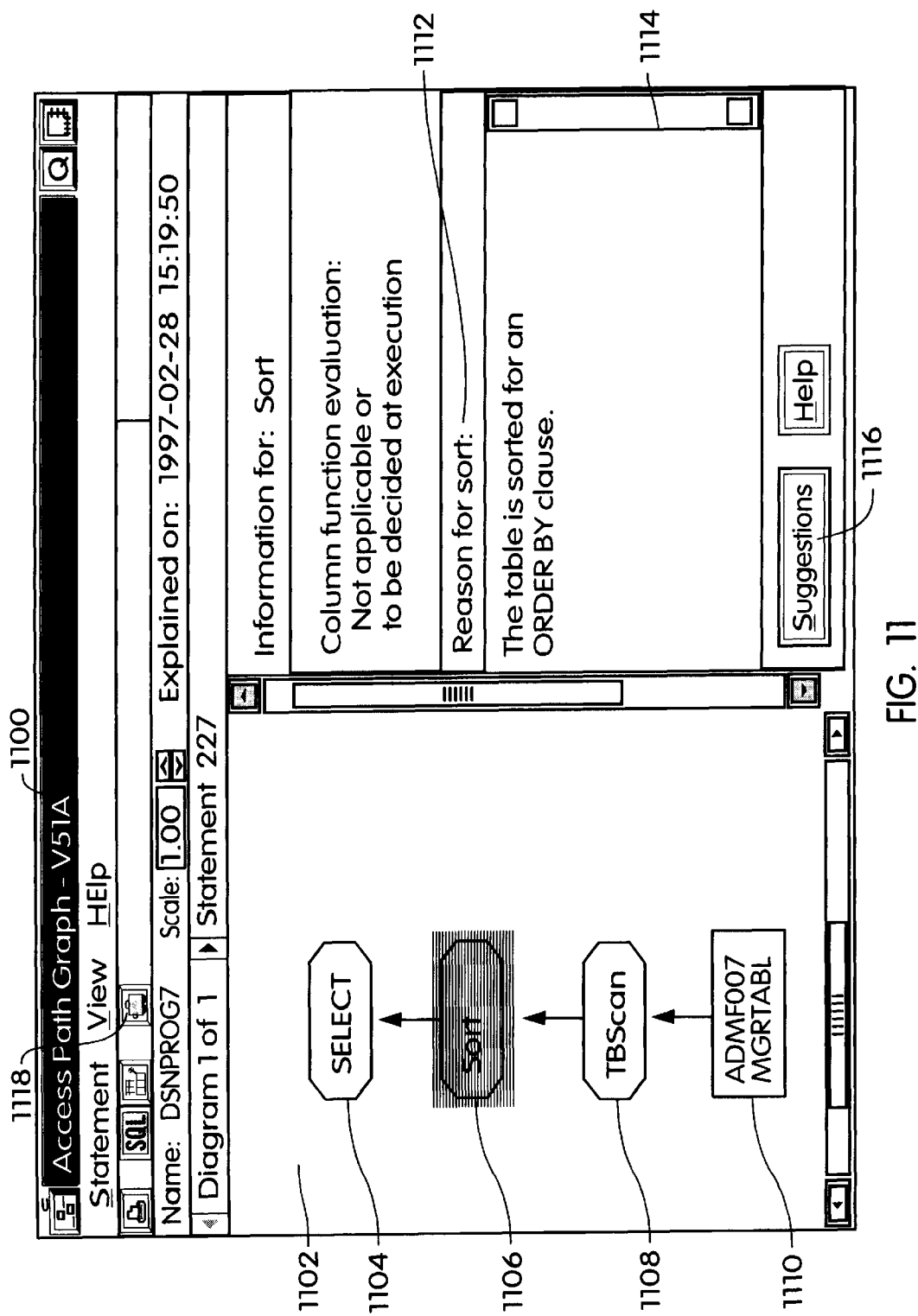
FIG. 11 illustrates an Access Path Graph window displayed by the database interpreter.

FIG. 11 illustrates an Access Path Graph window 1100 displayed by the database interpreter 120. The Access Path Graph window 1 100 displays a graphical representation of an access path 1102 for the explainable statement 1002, which was selected using the window illustrated in FIG. 10. The graphical representation of an access path 1102 shows that the SELECT statement 1104 results in a sort 1106 of a table 1110, which requires a scan 1108. The Reason for Sort information 1112 indicates that the statement contains an ORDER BY clause 1114, which is the reason a sort is performed. A user can select the sort node 1106 and the suggestions button 1116 to receive information from the database interpreter 120 on optimizing the sort 1106. Additionally, a user can select the Dynamic EXPLAIN icon 1118, which will be discussed in further detail below, to obtain a graphical representation of a modified SQL statement.

Figure 12:
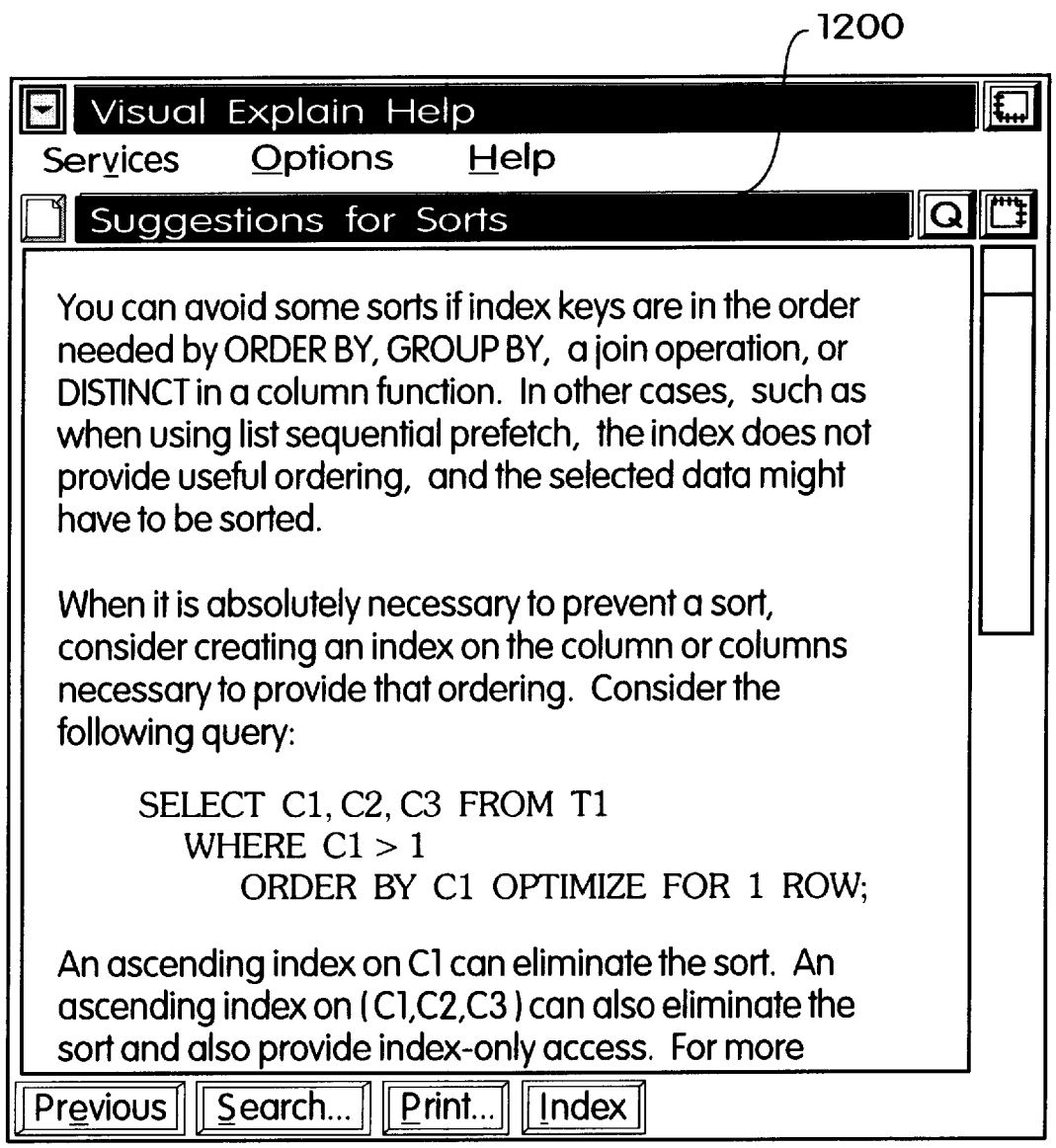
FIG. 12 illustrates a Suggestions window displayed by the database interpreter.

FIG. 12 illustrates a Suggestions window 1200 displayed by the database interpreter 120. The suggestions window 1200 indicates that an "optimize for 1 row" clause could eliminate the sort if the sort is a result of an order by or a group by clause and an index is available for the sorted column(s).

Figure 13:
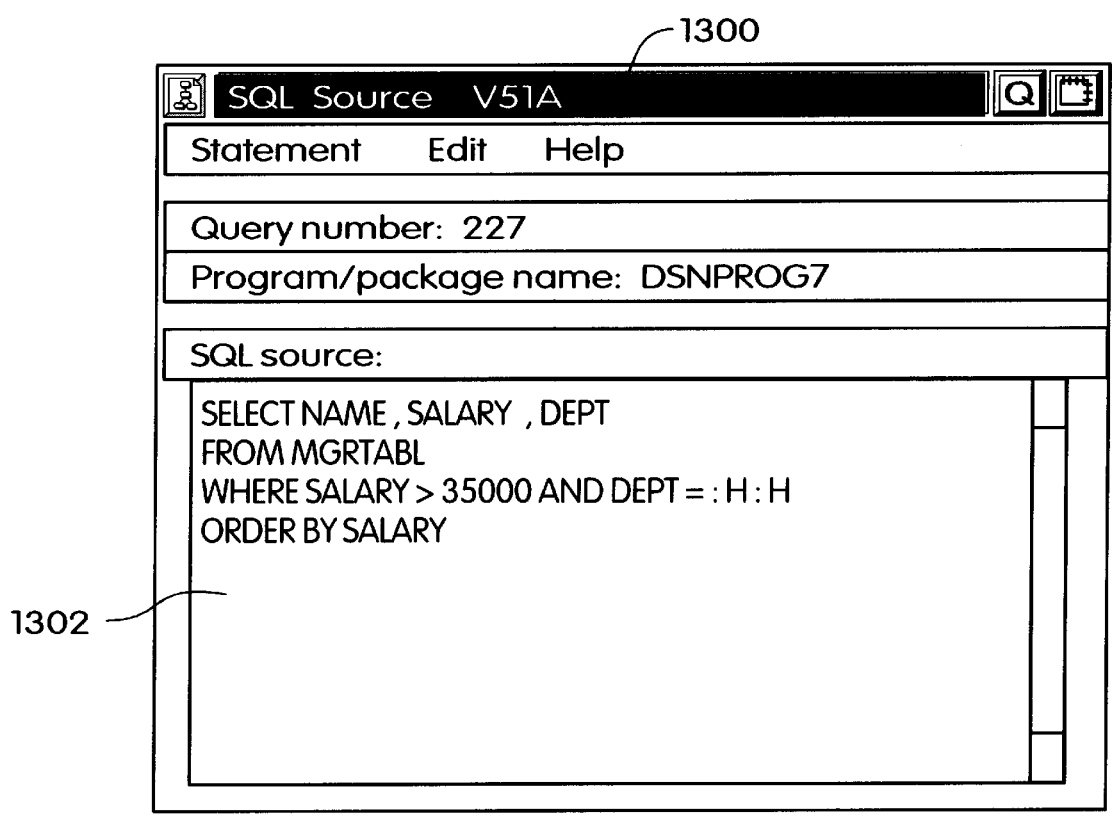
FIG. 13 illustrates an SQL Source window displayed by the database interpreter.

FIG. 13 illustrates an SQL Source window 1300 displayed by the database interpreter 120. The SQL Source window 1300 displays the text 1302 of the SQL statement 1002 selected in FIG. 10. The text 1302 of the SQL statement includes an ORDER BY clause and shows that SALARY is the column for the sort.

Figure 14:
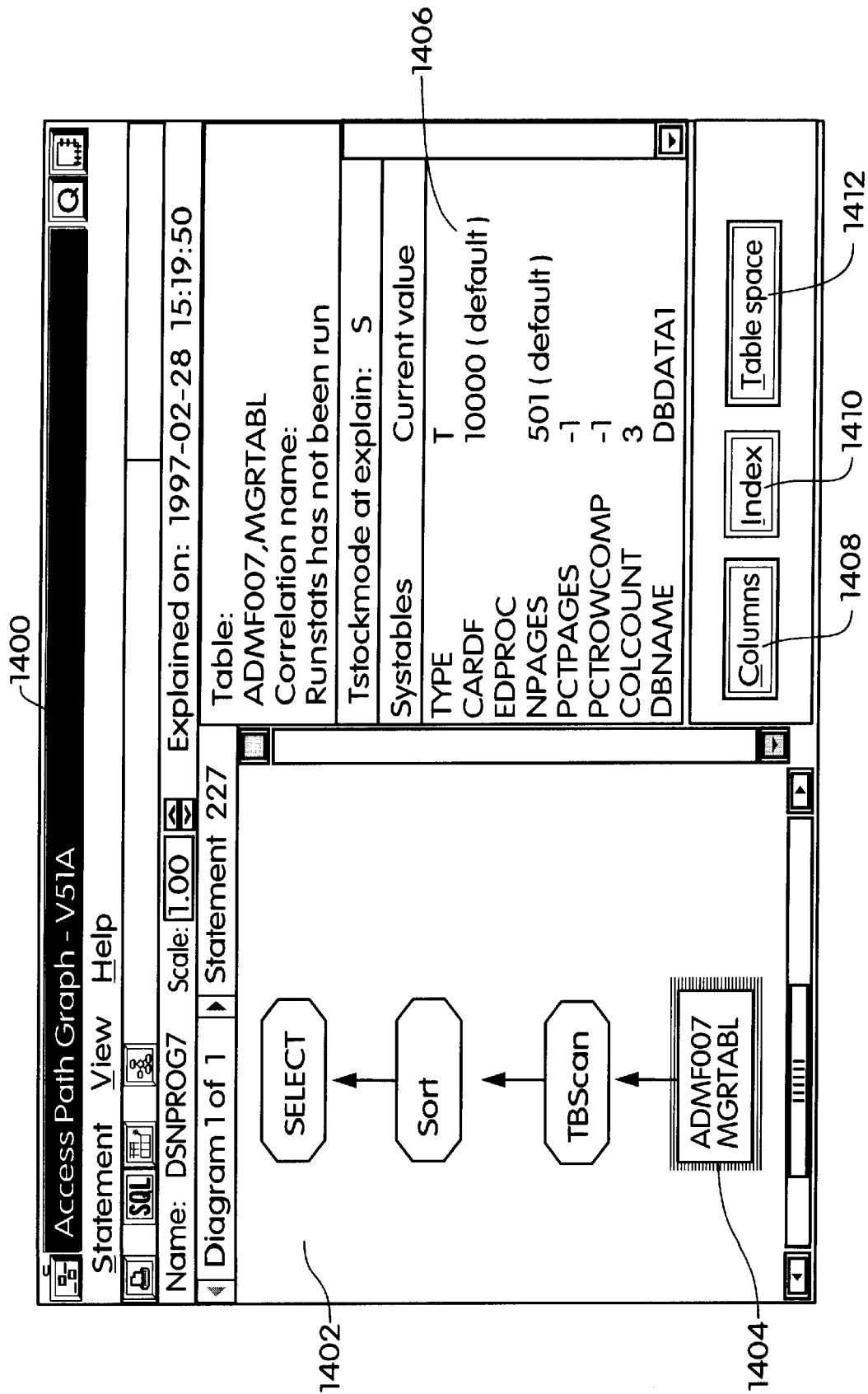
FIG. 14 illustrates an Access Path Graph window displayed by the database interpreter.

FIG. 14 illustrates an Access Path Graph window 1400 displayed by the database interpreter 120. To check to see whether an index is available for a table on the SALARY column, a user selects a table node 1404 of the graphical representation of an access path 1402. In the Access Path Graph window 1400, a user has selected a table node 1404 of the graphical representation of an access path 1402. The table statistics 1406 from the catalog are displayed on the window 1400. The database interpreter provides options to display the columns, indexes and table space associated with the table by providing a columns button 1408, an index button 1410, and a table space button 1412.

Figure 15:
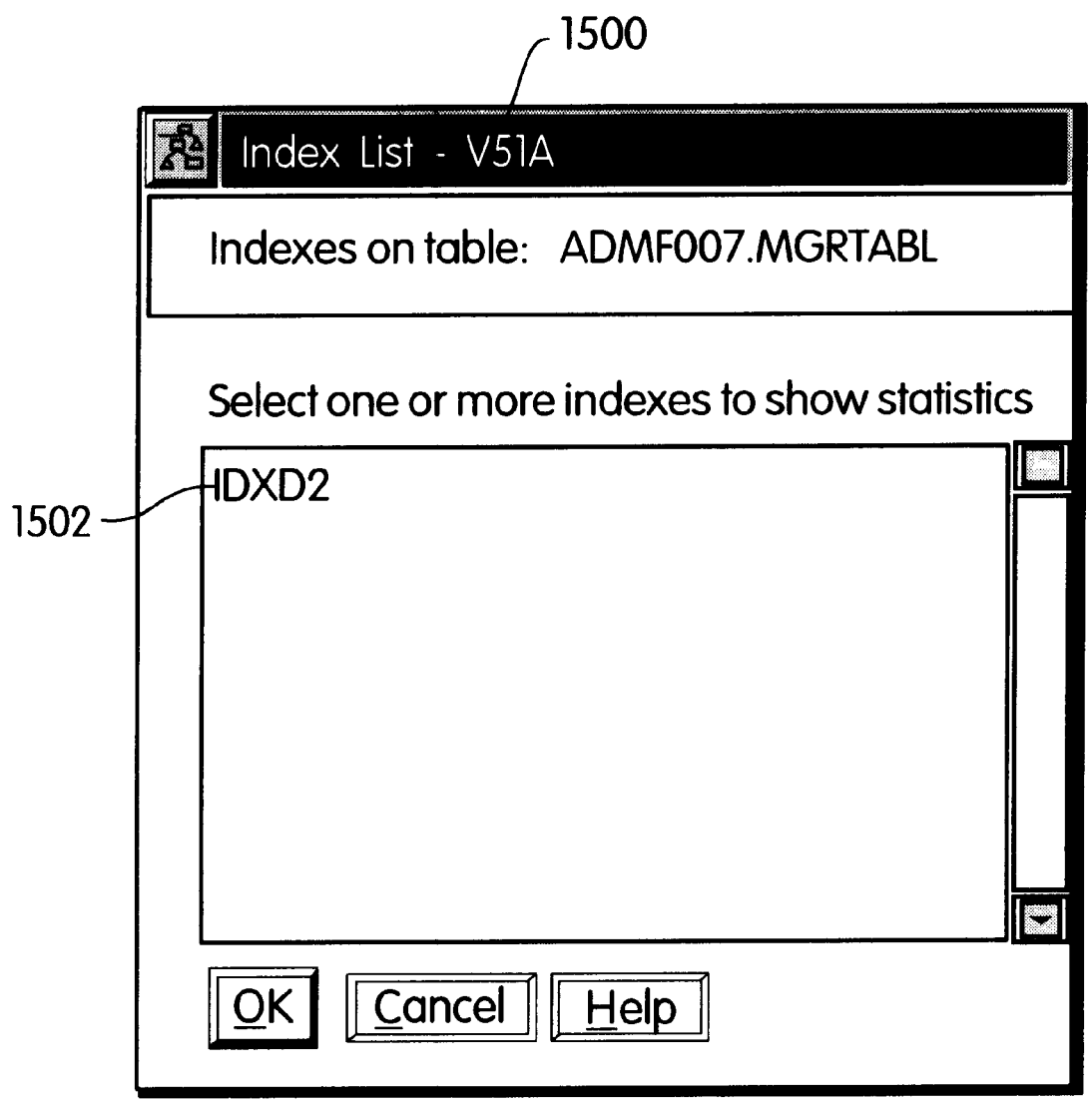
FIG. 15 illustrates an Index List window displayed by the database interpreter.

FIG. 15 illustrates an Index List window 1500 displayed by the database interpreter 120. The database interpreter 120 displays the Index List window 1500 when a user selects the index button 1410. The Index List window 1500 provides a list of indexes on a table. A user can select the listed index 1502 to display specific information about the index.

Figure 16:
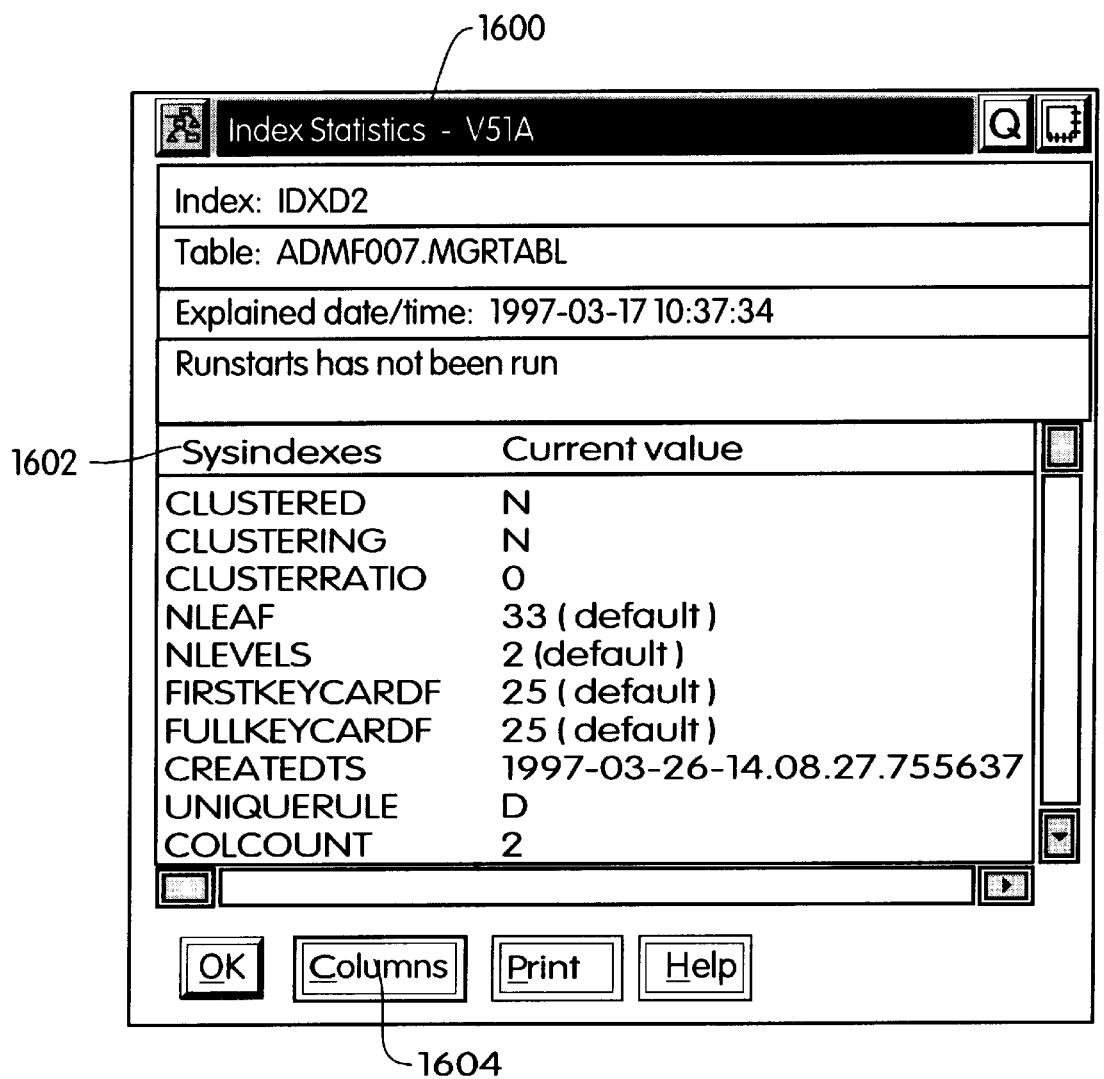
FIG. 16 illustrates an Index Statistics window displayed by the database interpreter.
Figure 17:
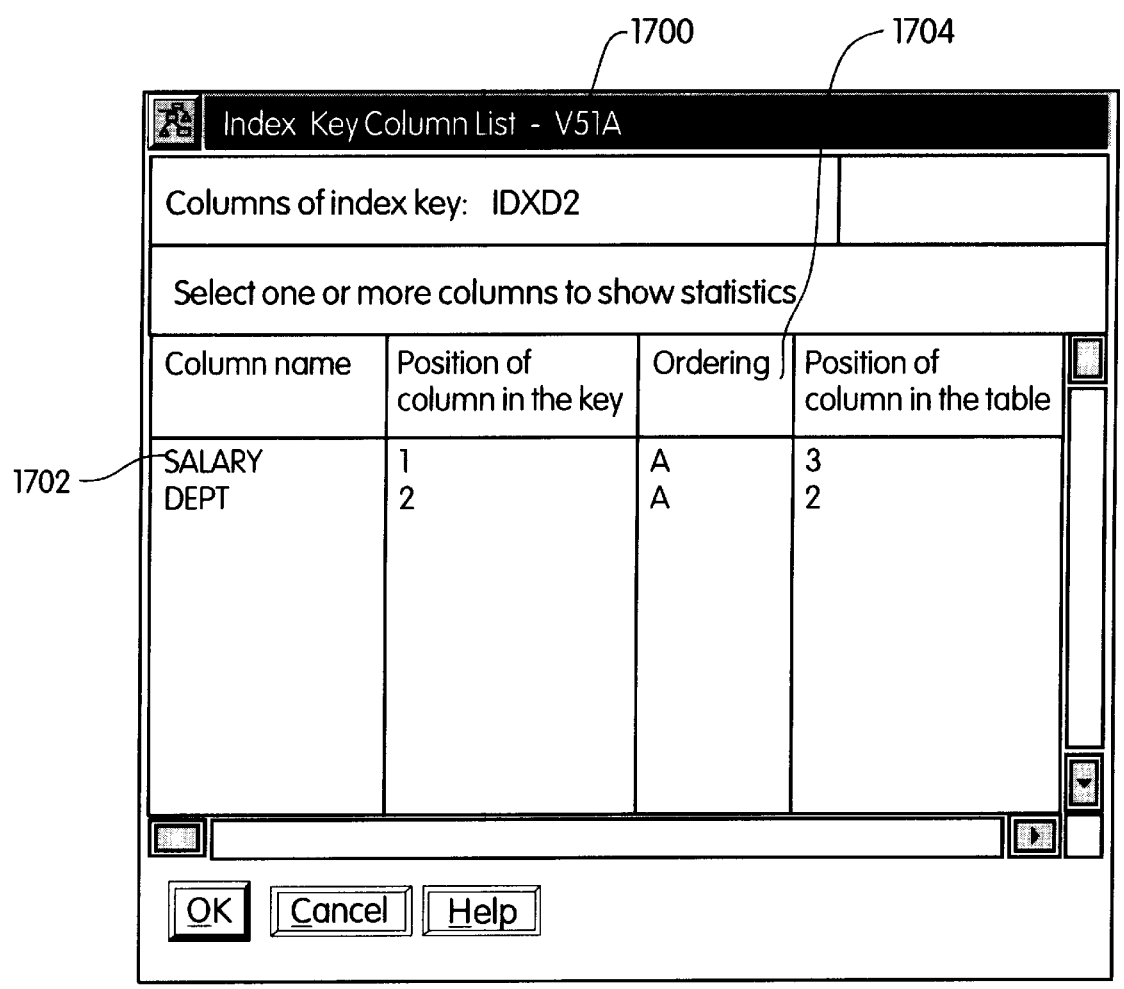
FIG. 17 illustrates an Index Key Column List window displayed by the database interpreter.

FIG. 16 illustrates an Index Statistics window 1600 displayed by the database interpreter 120. The database interpreter 120 displays the Index Statistics window 1600 in response to a user selecting an index 1502 from the Index List window 1500. The Index Statistics window 1600 shows the catalog statistics 1602 on the index 1502 the user selected, and also gives the user an option to see which columns make up the index. In particular, a user can select the columns button 1604 to see the columns. By knowing the columns, a user can determine whether the index can be used for the query to be optimized. As was discussed above, the query containing the sort can be optimized if an index is available for the sorted columns. FIG. 17 illustrates an Index Key Column List window 1700 displayed by the database interpreter 120. The database interpreter 120 displays the Index Key Columnn List window 1700 in response to a user selecting the columns button 1604. The Index Key Column List window 1700 indicates that SALARY 1702 is a column in the index. Because the order by clause is on the column SALARY and the first column in the index is SALARY 1702, the index can be used to optimize the query. Additionally, the Index Key Column List window 1700 indicates the ordering 1704 of the column in the index is in ascending order, which makes the index an ascending index.

Figure 18:
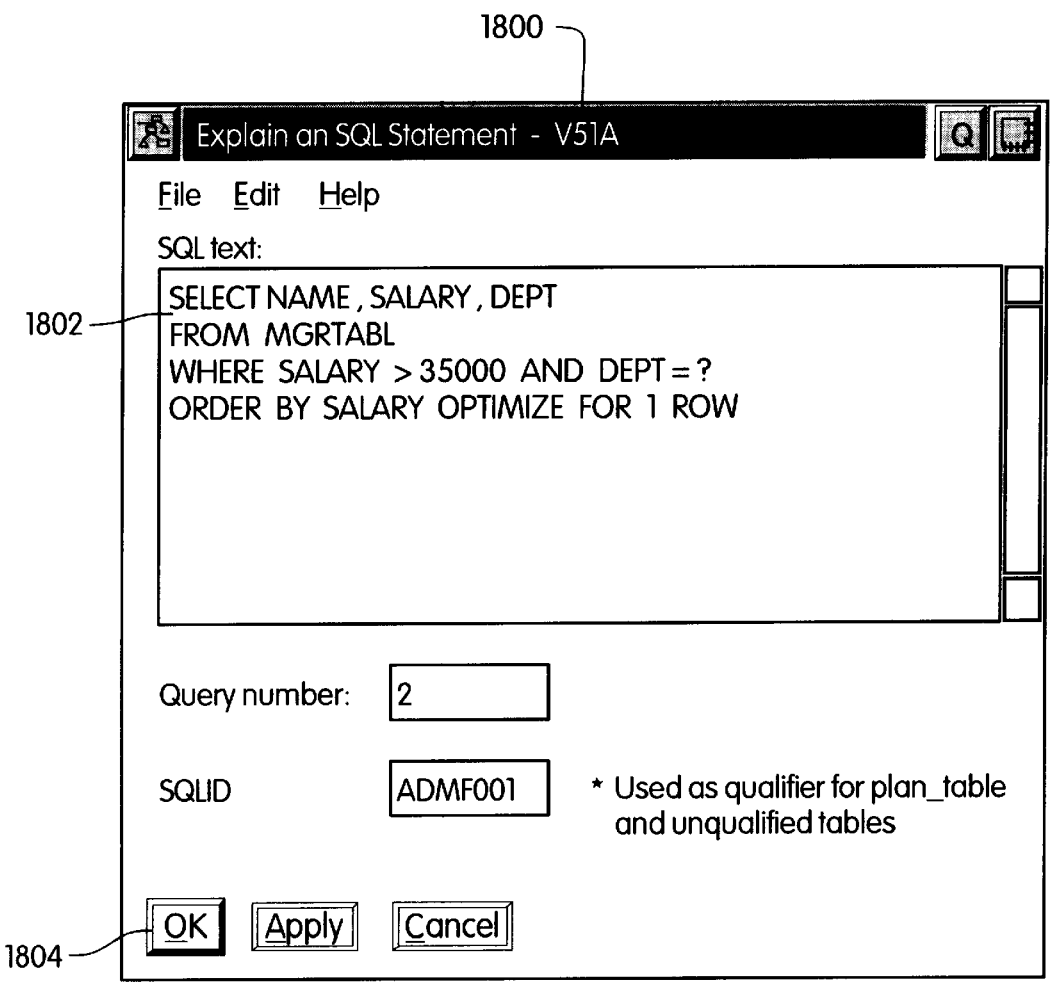
FIG. 18 illustrates a Dynamic EXPLAIN window displayed by the database interpreter.

FIG. 18 illustrates a Dynamic EXPLAIN window 1800 displayed by the database interpreter. A user can select the Dynamic EXPLAIN option using the EXPLAIN menu displayed in the main panel, which is illustrated in FIG. 4, or by selecting a Dynamic EXPLAIN icon 1118, which is illustrated in FIG. 11. The user selects the Dynamic EXPLAIN option to determine whether an OPTIMIZE FOR 1 ROW clause will eliminate the sort in the SQL statement 1002 to be optimized. The statement text 1802 for the SQL statement 1002, which corresponds to the graphical representation of an access path 1102, is filled in automatically when the Dynamic EXPLAIN icon 1118 is selected, converting any host variables into parameter markers. Then, a user can modify the SQL statement text 1802. For example, the "OPTIMIZE FOR 1 ROW" clause is added to the statement text 1802 and the OK button 1804 is selected. The database interpreter 120 then "EXPLAINs" the SQL statement and identifies the new graphical representation of an access path to be created.

Figure 19:
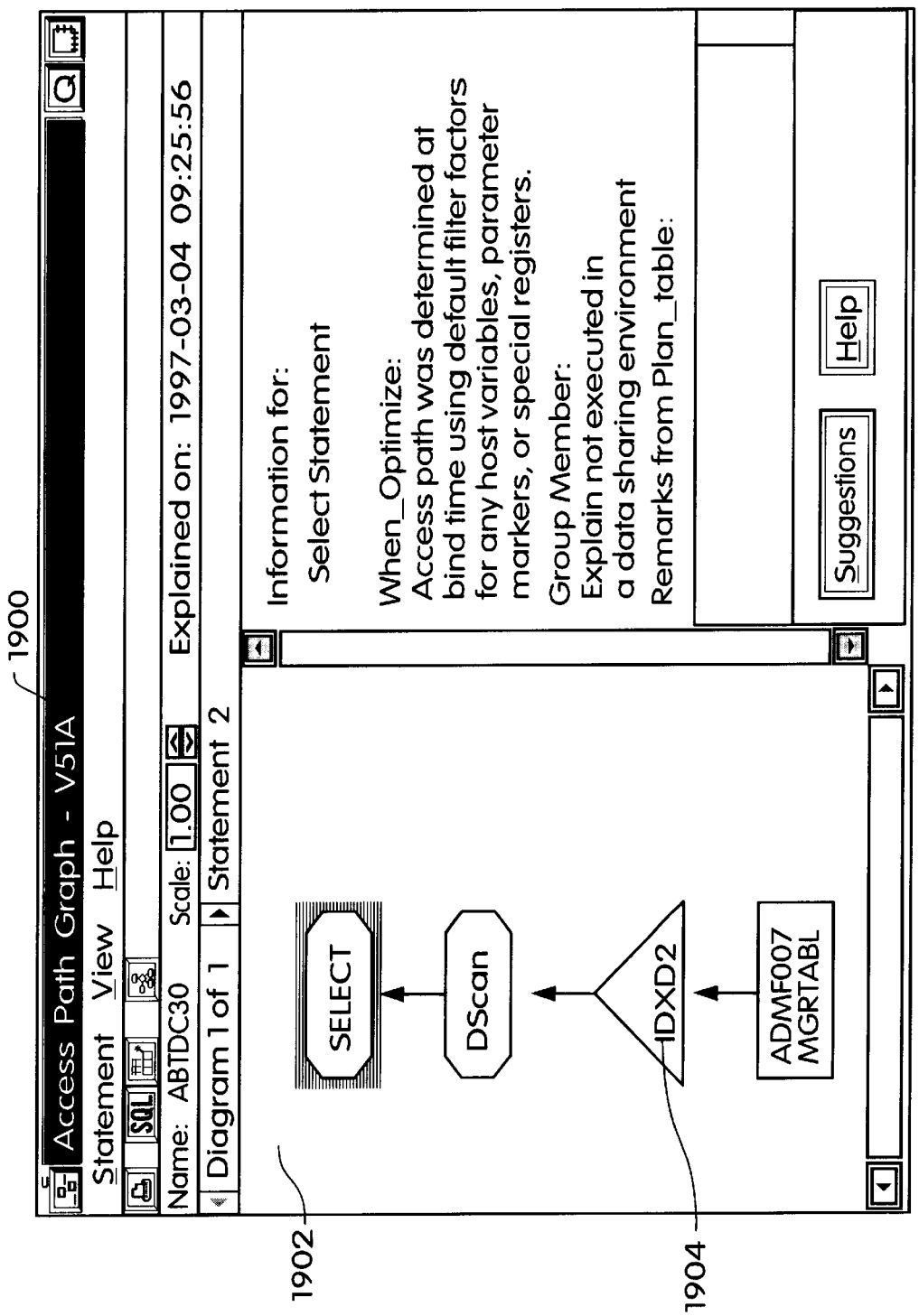
FIG. 19 illustrates a Dynamic EXPLAIN Graph window displayed by the database interpreter.

FIG. 19 illustrates an EXPLAIN Graph window 1900 displayed by the database interpreter 120. The EXPLAIN Graph window 1900 displays a graphical representation of an access path 1902 that corresponds to the modified SQL statement 1802. The resulting graphical representation of an access path 1902 shows that the query is now using the index 1904 and eliminating the sort 1106, thereby optimizing the query.

Figure 20A:
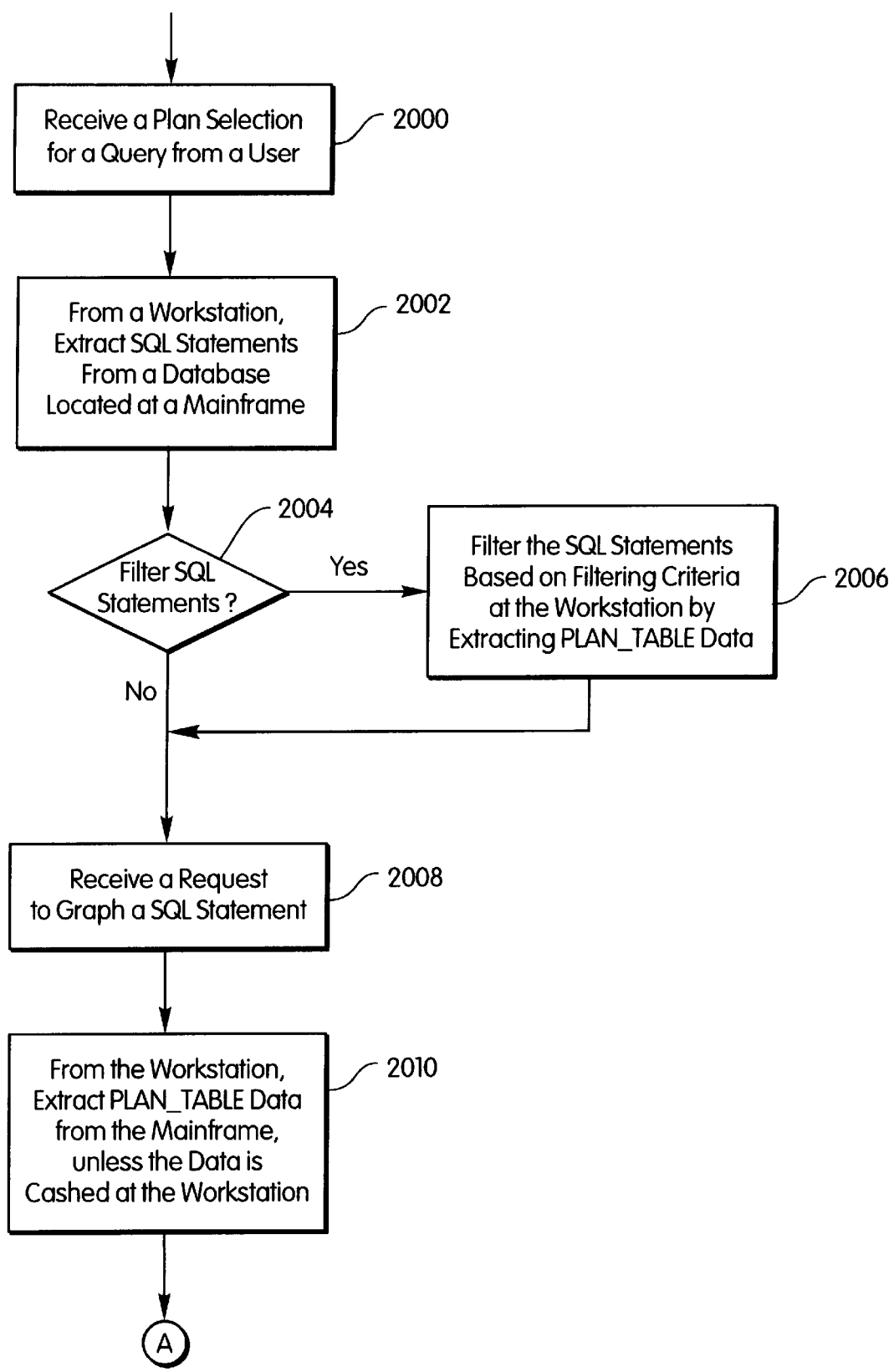
FIGS. 20A–20B are a flow diagram illustrating the steps performed by the database interpreter 120 to provide a graphical representation of an access path at a workstation 200 using PLAN_TABLE data from a mainframe 206.
Figure 20B:
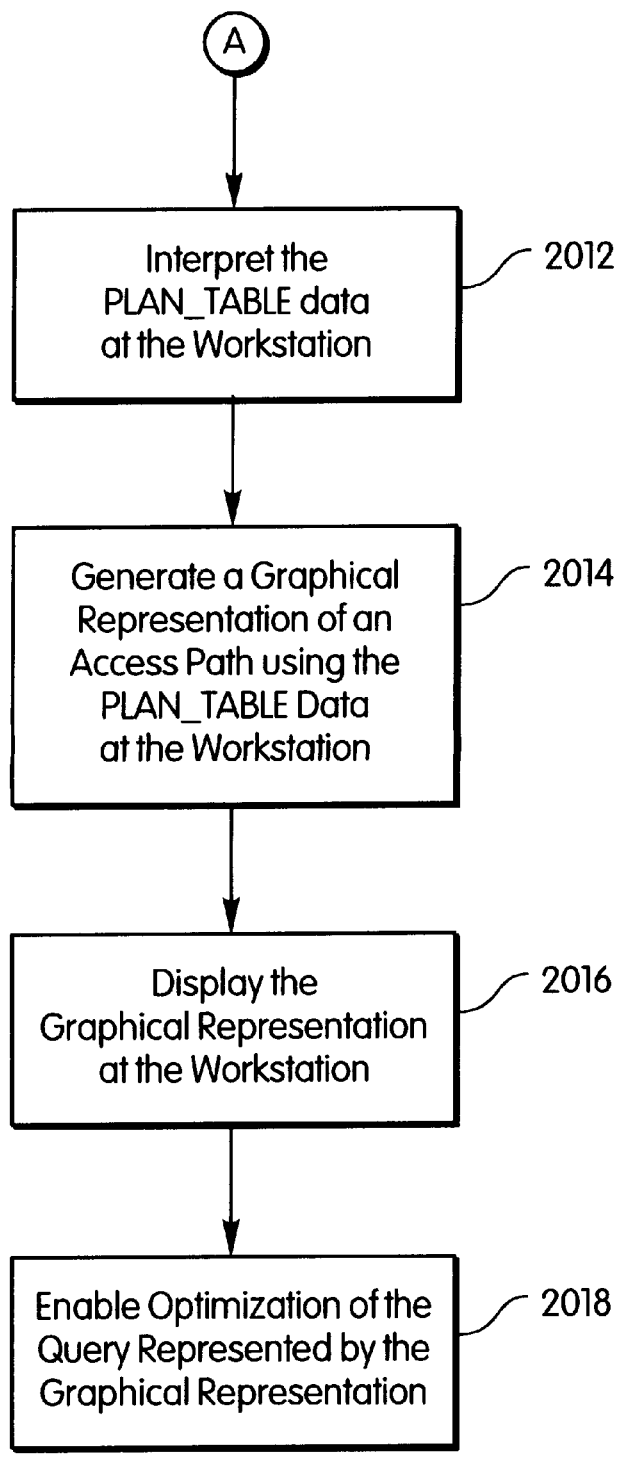

FIGS. 20A–20B are a flow diagram illustrating the steps performed by the database interpreter 120 to provide a graphical representation of an access path at a workstation 200 using PLAN_TABLE data from a mainframe 206. In Block 2000, the database interpreter 120 receives a plan selection from a user. A user typically knows whether a program or portion of a program in a plan is inefficient, and a user might select a plan to attempt to understand and improve the efficiency. In Block 2002, the database interpreter 120 at the workstation 200 extracts all SQL statements that are associated with the selected plan, and these SQL statements are extracted from a database located at a connected mainframe 206. In Block 2004, the database interpreter 120 determines whether the user has indicated that the SQL statements should be filtered. When the SQL statements are to be filtered, in Block 2006, the database interpreter 120 at the workstation 200 filters the SQL, statements based on filtering criteria received from the user by extracting PLAN_TABLE data from the mainframe. The database interpreter 120 provides an option to users to cache PLAN_TABLE data on the workstation. If this option is selected for a session, when PLAN_TABLE data is extracted for a particular plan or package, the database interpreter 120 stores the data in a cache and does not extract the data again.

When the SQL statements do not need to be filtered or after they have been filtered, in Block 2008, the database interpreter 120 receives a request to graph a SQL statement from the selected plan. In Block 2010, the database interpreter 120 at the workstation extracts PLAN_TABLE data from the mainframe, unless the data has already been extracted and cached. When data is cached, the database interpreter 120 uses the cached data according to its own method.

In Block 2012, the database interpreter 120 at the workstation 200 interprets the PLAN_TABLE data. In Block 2014, the database interpreter 120 at the workstation 200 generates a graphical representation of an access path using the PLAN_TABLE data. In Block 2016, the database interpreter 120 at the workstation 200 displays the graphical representation. In block 2018, the database interpreter 120 at the workstation 200 provides information to assist a user to optimize the query represented by the graphical representation.

Subsystem Parameter Browser

The database interpreter 120 provides a subsystem parameter browser that allows the user to view the DSNZPARM values that a subsystem is currently using, as well as the install panels and fields. The database interpreter 120 allows a user to look at the DSNZPARM values that the subsystem is currently using. The database interpreter 120 displays these values by the install field name, and also by the DSNZPARM parameter name. A search feature allows a user to find any string contained in the name, current value, or description. The present invention is especially advantageous in that a user may find subsystem parameter browsing useful in debugging RDBMS problems where the user needs to know the value of a DSNZPARM parameter.

The subsystem parameter browser uses a stored procedure 210 on the mainframe 206 to retrieve its data from the RDBMS software 208. The stored procedure 210 is part of the database interpreter 120. This stored procedure 210 uses an instrumentation facility interface (IFI) call to the RDBMS software 208 to get the RDBMS trace record, which contains all of the current DSNZPARM values. The stored procedure 210 then returns the values of the subsystem parameters to the database interpreter 120 in a single parameter. The database interpreter 120 formats the output and provides a simple technique for browsing through the information.

Figure 21:
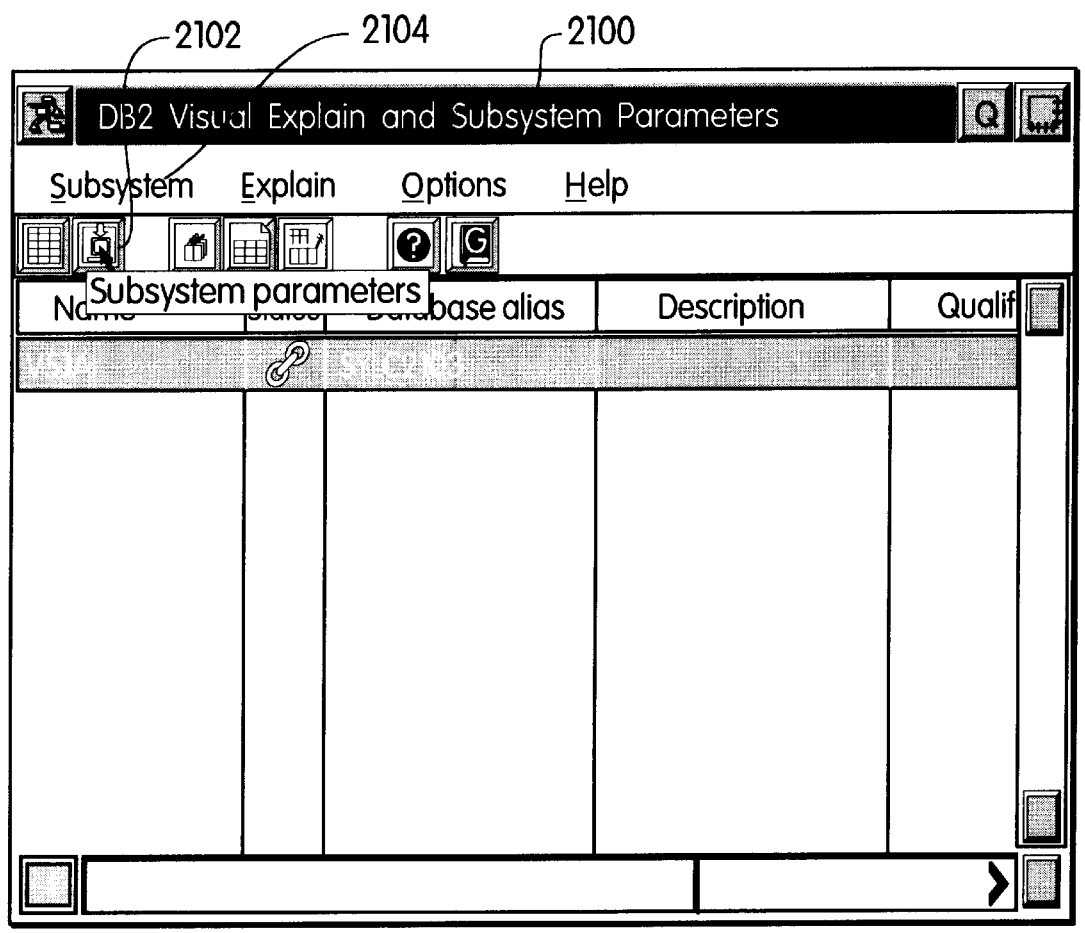
FIG. 21 illustrates a main panel displayed by the database interpreter.

FIG. 21 illustrates a main panel 2100 displayed by the database interpreter 120. To select the Subsystem Parameter function, a user can use a subsystem parameter browsing icon 2102 displayed on the main panel or use the pull-down menu "Subsystem" 2104 on the main panel 2100. The subsystem parameter browser displays all of the external DSNZPARM parameters and their values.

Figure 22:
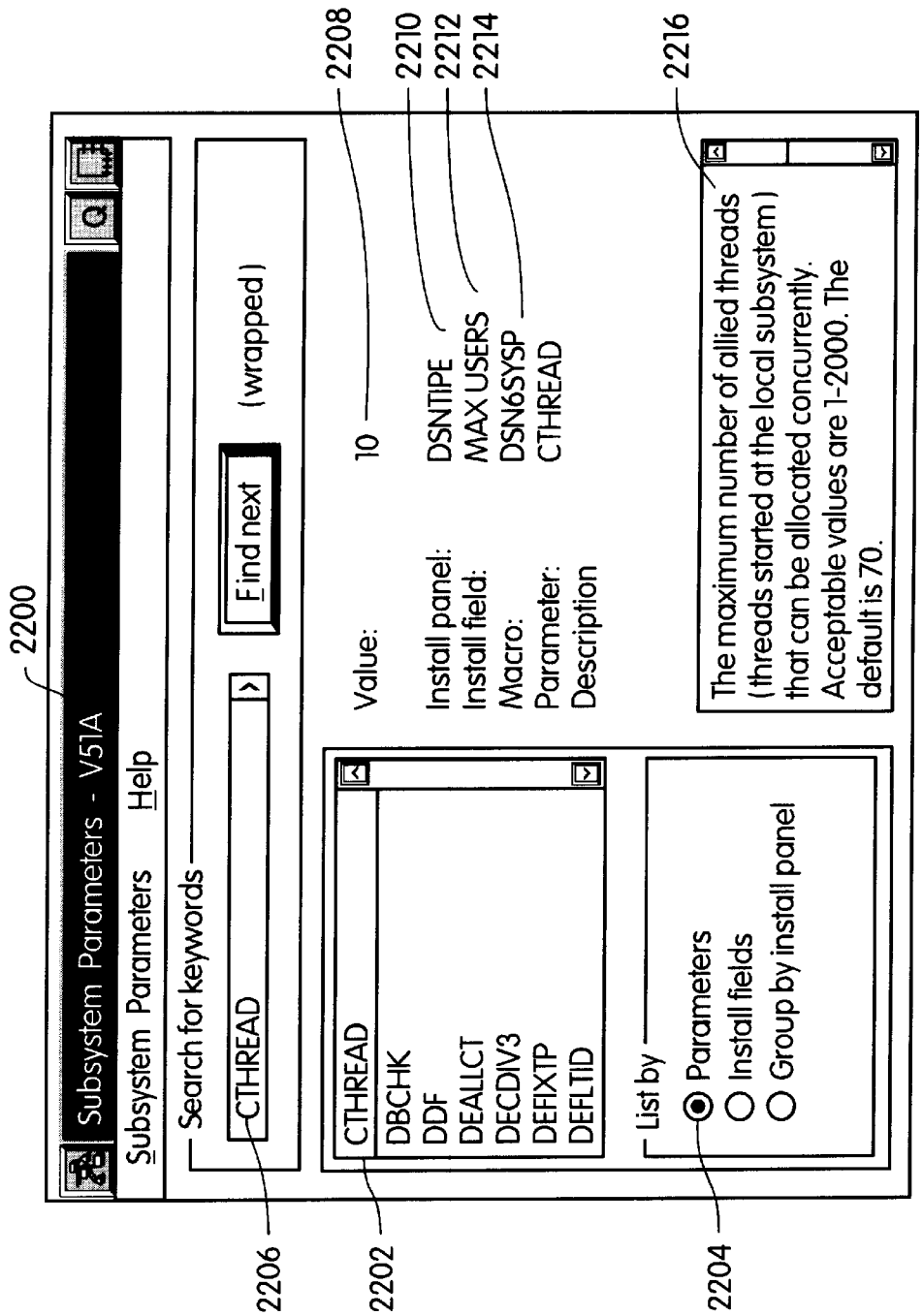
FIG. 22 illustrates a Subsystem Parameters window displayed by the database interpreter.

FIG. 22 illustrates a Subsystem Parameters window 2200 displayed by the database interpreter 120. The Subsystem Parameters window 2200 displays a list of fields 2202 by DSNZPARM parameter name when a user selects a parameters check box 2204 and allows a user to scroll through them. Additionally, a user can use a search option 2206 to search for a field. When a user has selected a parameter, for example, CTHREAD, the database interpreter 120 displays a value 2208, an install panel on which it is found 2210, an install field 2212, a macro 2214, and a description 2216.

Figure 23:
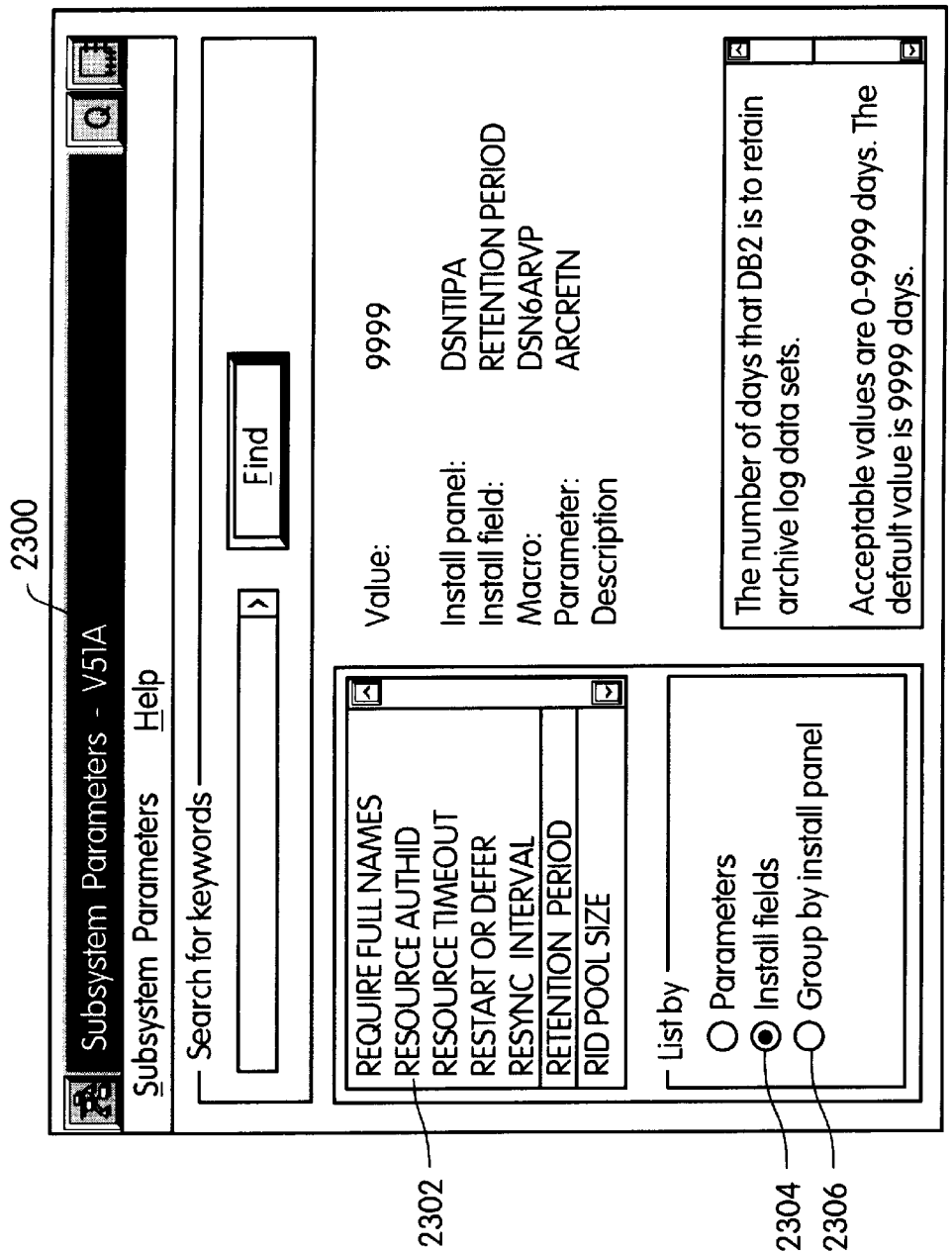
FIG. 23 illustrates a Subsystem Parameters window displayed by the database interpreter.

FIG. 23 illustrates a Subsystem Parameters window 2300 displayed by the database interpreter 120. A user can view install panel field names 2302 by selecting the install fields check box 2304. Additionally, a user can view group values by install panel field by selecting the group by install panel check box 2306.

Figure 24:
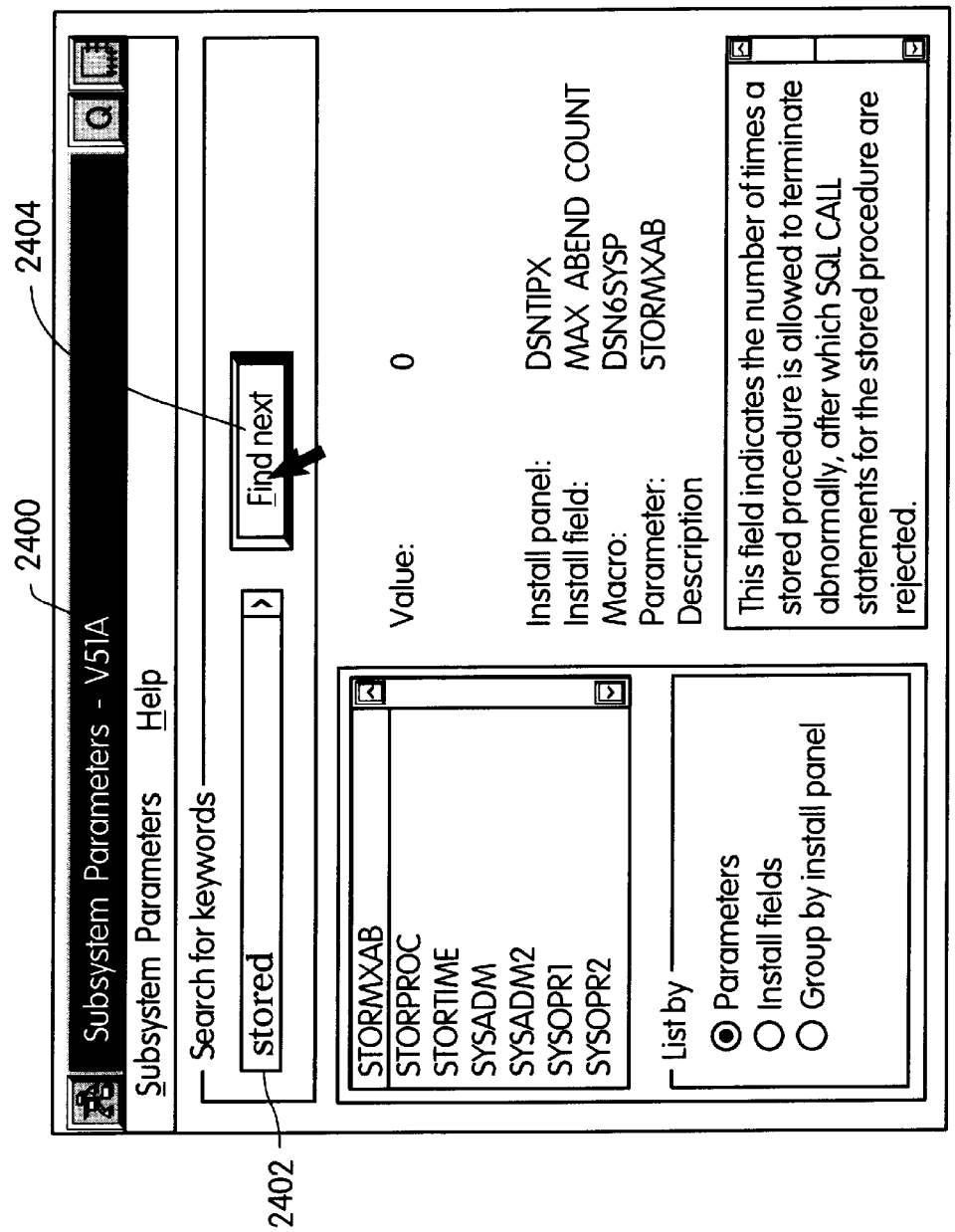
FIG. 24 illustrates a Subsystem Parameters window displayed by the database interpreter.

FIG. 24 illustrates a Subsystem Parameters window 2400 displayed by the database interpreter 120. When a user is interested in finding the ZPARM, for example, that controls the maximum abend count in stored procedures, the user can enter "stored" as the search value 2402, and the database interpreter 120 will find all of the DSNZPARMs that have "stored" in their description. If there are multiple entries with a search value, the database interpreter 120 will continue to find the values until it gets to the end of the list, and then will wrap around to the top. To indicate that the search facility is starting at the top again, the database interpreter 120 displays "wrapped" in blue next to the find button 2404.

Figure 25:
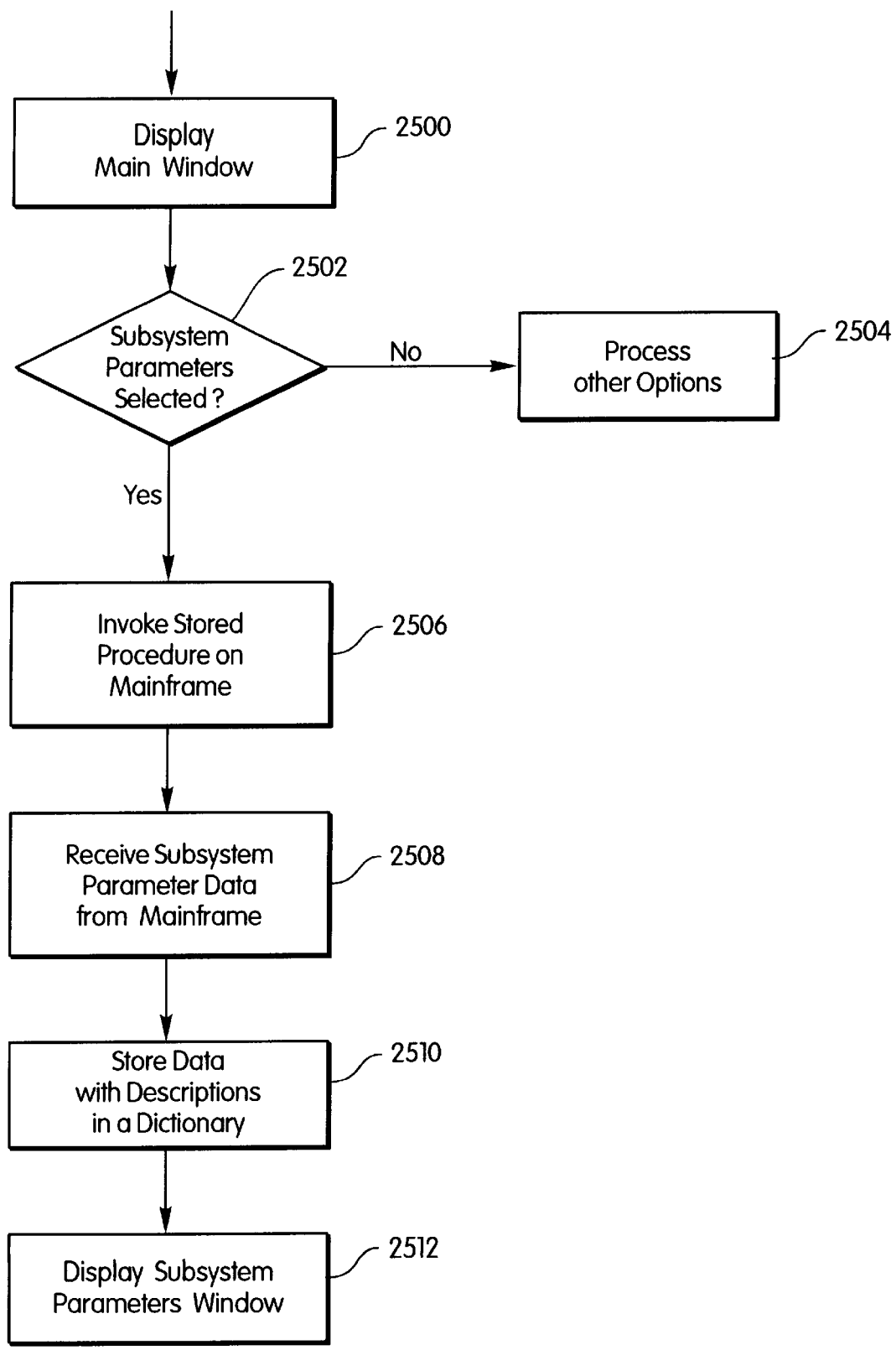
FIG. 25 is a flow diagram illustrating the steps performed by the database interpreter to provide subsystem parameter browsing.

FIG. 25 is a flow diagram illustrating the steps performed by the database interpreter 120 to provide subsystem parameter browsing. In Block 2500, the database interpreter 120 displays a main window. In Block 2502, the database interpreter 120 determines whether subsystem parameter browsing has been selected. If subsystem parameter browsing has not been selected, the database interpreter 120 continues at Block 2504 to process other options. If subsystem parameter browsing has been selected, the database interpreter 120 continues at Block 2506 to invoke a stored procedure on the mainframe to obtain data. In Block 2508, the database interpreter 120 receives subsystem parameter data from the mainframe. In Block 2510, the database interpreter 120 stores the subsystem parameter data along with descriptions in a dictionary. In Block 2512, the database interpreter 120 displays the subsystem parameters window through which a user can obtain subsystem parameter data.

Figure 26:
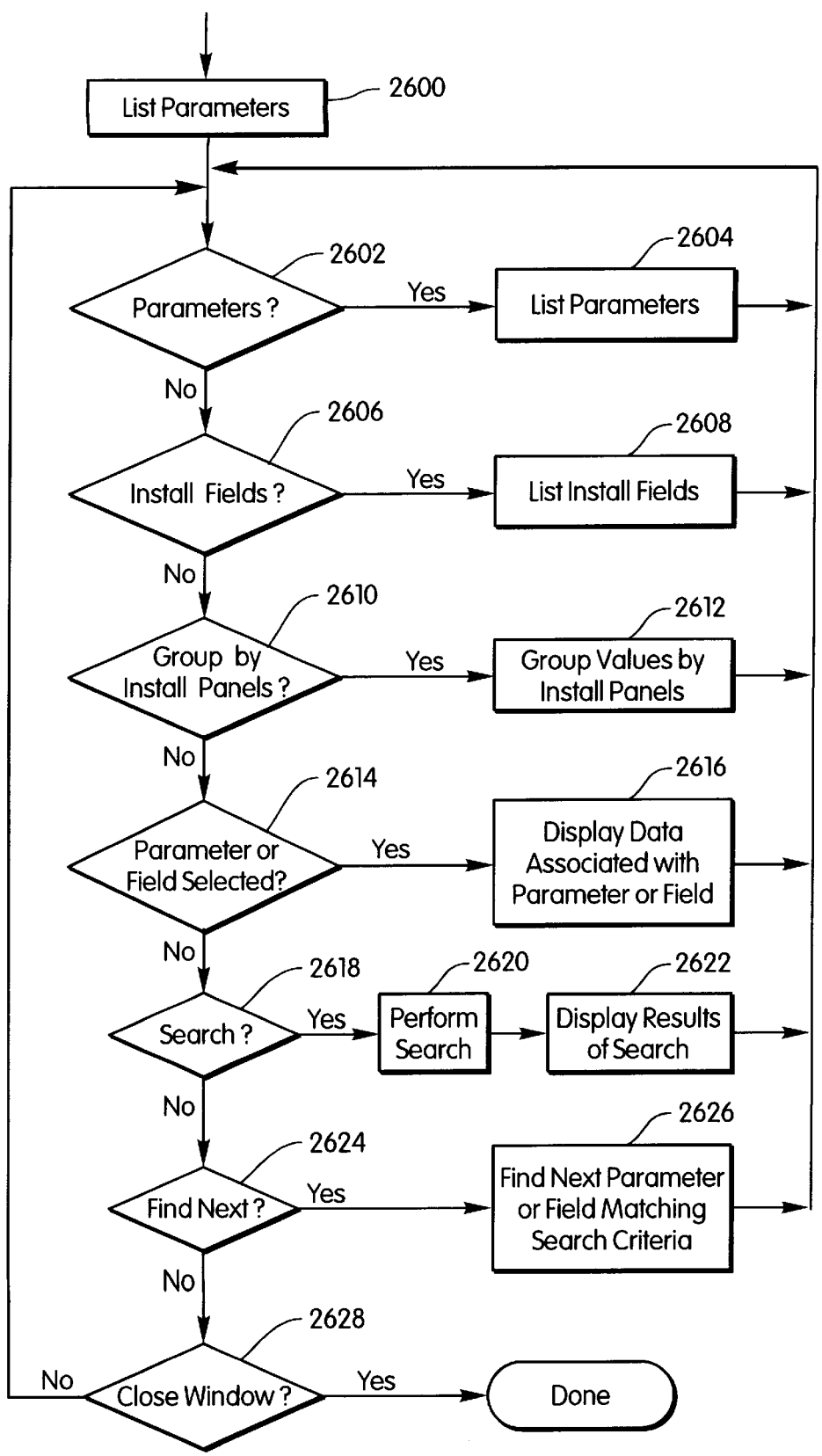
FIG. 26 is a flow diagram illustrating the steps performed by the database interpreter when subsystem parameter browsing is selected.

FIG. 26 is a flow diagram illustrating the steps performed by the database interpreter 120 when subsystem parameter browsing is selected. In Block 2600, the database interpreter 120 lists the parameters by default in response to a user requesting subsystem parameter browsing from the main panel. In Block 2602, if a user has selected a parameters option, the database interpreter 120 continues to Block 2604 to list the parameters, otherwise, the database interpreter 120 continues to Block 2606. Although the database interpreter 120 lists parameters by default, a user might select the parameters option if the user has already selected another option and wants to view the list of parameters. In Block 2606, if a user has selected an install fields option, the database interpreter 120 continues to Block 2608 to list the install fields, otherwise, the database interpreter 120 continues to Block 2610. In Block 2610, if a user has selected a group by install fields option, the database interpreter 120 continues to Block 2612 to group values by install panel fields, otherwise, the database interpreter 120 continues to Block 2614.

In Block 2614, if a user has selected a parameter or a field, the database interpreter 120 continues to Block 2616, otherwise, the database interpreter 120 continues to Block 2618. In Block 2616, the database interpreter 120 displays data associated with the selected parameter or field. In Block 2618, if a user has requested a search, the database interpreter 120 continues at Block 2620, otherwise, the database interpreter 120 continues at Block 2624. In Block 2620, the database interpreter 120 performs a search for one or more parameters or fields. In Block 2622, the database interpreter 120 displays the results of the search. In Block 2624, if a user has selected the find next button, the database interpreter 120 continues at Block 2626, otherwise, the database interpreter 120 continues at Block 2628. In Block 2626, the database interpreter 120 finds the next field or parameter matching the search criteria. In Block 2628, if a user has closed the window, the database interpreter 120 terminates subsystem parameter browsing, otherwise, the database interpreter 120 loops back to process additional user input.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented database interpreter. The invention provides an improved method of extracting plan table data from a database. Moreover, the invention provides easy access to subsystem parameters. Furthermore, the invention provides a graphical representation of plan table data on a workstation connected to a mainframe having a database that stores the plan table data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of retrieving data from a database stored on a data storage device connected to a computer, the method comprising the steps of:

displaying a main window providing selection of subsystem parameter browsing, wherein the subsystem parameters describe values of user set options;

when subsystem parameter browsing is selected, extracting subsystem parameters from the database;

providing access to the extracted subsystem parameters within a subsystem parameters window, which provides options for listing the subsystem parameters by at least one of a parameter name, an install field name, or values grouped by install panel;

when an option for listing the subsystem parameters is selected, further comprising displaying a list of subsystem parameters by the selected option, thus allowing for browsing; and when the parameter name or the install field name is selected from the displayed list, further comprising providing information about the selected install field or parameter, the information comprising at least two of a value, a macro, an install panel name, the install field name, and the parameter name of the selected install field or parameter.

2. The method of claim 1 above, wherein the subsystem parameters window further comprises a parameters list option for providing a list of subsystem parameters.

3. The method of claim 1 above, wherein the information further comprises a description of a selected subsystem parameter.

4. The method of claim 3 above, wherein the subsystem parameters window further comprises a search option for providing a capability to search for a subsystem parameter by searching for search descriptors in the description of each subsystem parameter.

5. The method of claim 1 above, wherein the step of extracting subsystem parameters from the database further comprises:

invoking a stored procedure to extract the subsystem parameters from the database, wherein the stored procedure comprises means for making a call to a component of the database, and receiving the extracted subsystem parameters from the database.

6. The method of claim 1 above, wherein the computer is a workstation that is connected to a mainframe storing the database, further comprising:

when a graphical representation of a plan table is selected, at the workstation, extracting plan table data from the database at the mainframe; and displaying the graphical representation of the plan table at the workstation.

7. The method of claim 6 above, wherein the step of extracting plan table data further comprises the step of filtering SQL statements based on filtering criteria.

8. The method of claim 6 above, further comprising providing information for explorations of optimization of an access path of a SQL statement.

9. The method of claim 8 above, wherein the step of providing information further comprises providing suggestions for improving the access path of the SQL statement.

10. The method of claim 9 above, further comprising the step of providing a capability to graphically represent an improved access path of the SQL statement dynamically.

11. The method of claim 6 above, wherein the step of displaying the graphical representation further comprises providing additional descriptive data about the graphical representation.

12. An apparatus for retrieving data, comprising:
a first computer having a data storage device connected thereto, wherein the data storage device stores a database;
one or more computer programs at a second computer, performed by the second computer, for displaying a main window providing selection of subsystem parameter browsing, wherein the subsystem parameters describe values of user set options;
when the subsystem parameter browsing is selected, extracting subsystem parameters from the database;
providing access to the extracted subsystem parameters within a subsystem parameters window, which provides options for listing the subsystem parameters by at least one of parameter name, an install field name, or values grouped by install panel;
when an option for listing the subsystem parameters is selected, further comprising displaying a list of subsystem parameters by the selected option, thus allowing for browsing; and
when the parameter name or the install field name is selected from the displayed list, further comprising providing information about the selected install field or parameter, the information comprising at least two of a value, a macro, an install panel name, the install field name, and the parameter name of the selected install field or parameter.

13. The apparatus of claim 12 above, wherein the subsystem parameters window further comprises a search option for providing a capability to search for a subsystem parameter.

14. The apparatus of claim 12 above, wherein the information further comprises a description of a selected subsystem parameter.

15. The apparatus of claim 12 above, wherein the subsystem parameters window further comprises a search option for providing a capability to search for a subsystem parameter by searching for search descriptors in the description of each subsystem parameter.

16. The apparatus of claim 12 above, wherein the means for extracting subsystem parameters from the database further comprises:
means for invoking a stored procedure to extract the subsystem parameters from the database, wherein the stored procedure comprises means for making a call to a component of the database; and
means for receiving the extracted subsystem parameters from the database.

17. The apparatus of claim 12 above, wherein the computer is a workstation that is connected to a mainframe storing the database, further comprising:
means for, when graphical representation of a plan table is selected, at the workstation, extracting plan table data from the database at the mainframe; and
means for displaying the graphical representation of the plan table data at the workstation.

18. The apparatus of claim 17 above, wherein the means for extracting plan table data further comprises the means for filtering SQL statements based on filtering criteria.

19. The apparatus of claim 17 above, further comprising means for providing information for explorations of optimization of an access path of a SQL statement.

20. The apparatus of claim 19 above, wherein the means for providing information further comprises the means for providing suggestions for improving the access path of the SQL statement.

21. The apparatus of claim 20 above, further comprising the means for providing a capability to graphically represent an improved access path of the SQL statement dynamically.

22. The apparatus of claim 17 above, wherein the means for displaying the graphical representation further comprises providing additional descriptive data about the graphical representation.

23. An article of manufacture comprising a computer program carrier readable by a computer and embodying one or more instructions executable by the computer to perform method steps for retrieving data from a database stored in a data storage device connected to the computer, the method comprising the steps of:
displaying a main window providing selection of subsystem parameter browsing, wherein the subsystem parameters describe values of user set options;
when subsystem parameter browsing is selected, extracting subsystem parameters from the database;
providing access to the extracted subsystem parameters within a subsystem parameters window, which provides options for listing the subsystem parameters by at least one of parameter name, an install field name, or values grouped by install panel;
when an option for listing the subsystem parameters is selected, further comprising displaying a list of subsystem parameters by the selected option, thus allowing for browsing; and
when the parameter name or the install field name is selected from the displayed list, further comprising providing information about the selected install field or parameter, the information comprising at least two of a value, a macro, an install panel name, the install field name, and the parameter name of the selected install field or parameter.

24. The article of manufacture of claim 23 above, wherein the subsystem parameters window further comprises a search option for providing a capability to search for a subsystem parameter.

25. The article of manufacture of claim 23 above, wherein the information window further comprises a description of a selected subsystem parameter.

26. The article of manufacture of claim 25 above, wherein the subsystem parameters window further comprises a search option for providing a capability to search for a subsystem parameter by searching for search descriptors in the description of each subsystem parameter.

27. The article of manufacture of claim 23 above, wherein the step of extracting subsystem parameters from the database further comprises:

invoking a stored procedure to extract the subsystem parameters from the database, wherein the stored procedure comprises means for making a call to a component of the database; and receiving the extracted subsystem parameters from the database.

28. The article of manufacture of claim 23 above, wherein the computer is a workstation that is connected to a mainframe storing the database, further comprising:

when a graphical representation of a plan table is selected, at the workstation, extracting plan table data from the database at the mainframe; and displaying the graphical representation of the plan table data at the workstation.

29. The article of manufacture of claim 28 above, wherein the step of extracting plan table data further comprises the step of filtering SQL statements based on filtering criteria.

30. The article of manufacture of claim 28 above, further comprising providing information for explorations of optimization of an access path of a SQL statement.

31. The article of manufacture of claim 30 above, wherein the step of providing information further comprises providing suggestions for improving the access path of the SQL statement.

32. The article of manufacture of claim 31 above, further comprising the step of providing a capability to graphically represent an improved access path of the SQL statement dynamically.

33. The article of manufacture of claim 28 above, wherein the step of displaying the graphical representation further comprises providing additional descriptive data about the graphical representation.

* * * * *

UNITED STATES PATENT AND TRADEMARK OFFICE
CERTIFICATE OF CORRECTION

PATENT NO. : 6,243,703 B1
DATED : June 5, 2001
INVENTOR(S) : Tanya Couch and Catherine E. Drummond It is certified that error appears in the above-identified patent and that said Letters Patent is hereby corrected as shown below:

Claim 2,
Lines 2 and 3, after "comprises", please delete "a parameters list option for providing a list of subsystem parameters." and insert -- a search option for providing a capability to search for a subsystem parameter. --

Signed and Sealed this

Twenty-ninth Day of January, 2002

Attest:

Attesting Officer

JAMES E. ROGAN
Director of the United States Patent and Trademark Office